United States Patent
Kim et al.

(10) Patent No.: US 9,780,934 B2
(45) Date of Patent: Oct. 3, 2017

(54) METHOD FOR PUNCTURING UE SPECIFIC REFERENCE SIGNAL IN RADIO ACCESS SYSTEM SUPPORTING NEW CARRIER TYPE AND APPARATUS SUPPORTING SAME

(71) Applicant: LG Electronics Inc., Seoul (KR)

(72) Inventors: Bonghoe Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 14/889,587

(22) PCT Filed: May 9, 2014

(86) PCT No.: PCT/KR2014/004144
§ 371 (c)(1),
(2) Date: Nov. 6, 2015

(87) PCT Pub. No.: WO2014/182116
PCT Pub. Date: Nov. 13, 2014

(65) Prior Publication Data
US 2016/0080121 A1 Mar. 17, 2016

Related U.S. Application Data

(60) Provisional application No. 61/821,248, filed on May 9, 2013.

(51) Int. Cl.
*H04L 5/00* (2006.01)
*H04W 56/00* (2009.01)
*H04L 25/02* (2006.01)

(52) U.S. Cl.
CPC ............ *H04L 5/005* (2013.01); *H04L 5/0094* (2013.01); *H04W 56/00* (2013.01);
(Continued)

(58) Field of Classification Search
None
See application file for complete search history.

(56) References Cited

U.S. PATENT DOCUMENTS

| | | | |
|---|---|---|---|
| 2011/0111781 A1* | 5/2011 | Chen ........................ | H04B 7/02 455/507 |
| 2014/0204851 A1* | 7/2014 | Chen ..................... | H04W 48/12 370/329 |

(Continued)

FOREIGN PATENT DOCUMENTS

| | | |
|---|---|---|
| WO | 2012148236 | 11/2012 |
| WO | 2013025069 | 2/2013 |

OTHER PUBLICATIONS

Hitachi Ltd., "Performance Evaluation of DM-RS Puncturing on NCT," R1-130343, 3GPP TSG RAN WG1 Meeting #72, St Julian's, Malta, Jan. 28-Feb. 1, 2013, see pp. 1-4.

(Continued)

*Primary Examiner* — Xavier Szewai Wong
(74) *Attorney, Agent, or Firm* — Dentons US LLP

(57) ABSTRACT

The present invention relates to methods for performing a radio resource measurement in a synchronized cell when a similar co-location is applied and apparatuses for supporting the same. As an embodiment of the present invention, a method in which a user equipment (UE) performs a radio resource measurement (RRM) in a radio access system may comprise the steps of: receiving a higher layer signal including similar co-location (QCL) information of a channel state information reference signal (CSI-RS) of a first cell and a cell specific reference signal (CRS) and/or a CSI-RS of a second cell; receiving the CRS and/or the CSI-RS of the second cell on the basis of the QCL information; and measuring a first RRM of the first cell by using the CRS and/or the CSI-RS of the second cell.

10 Claims, 25 Drawing Sheets

(52) U.S. Cl.
CPC ......... *H04W 56/0015* (2013.01); *H04L 5/001* (2013.01); *H04L 5/0051* (2013.01); *H04L 25/0224* (2013.01)

(56) References Cited

U.S. PATENT DOCUMENTS

2015/0257095 A1* 9/2015 Sun .................. H04W 52/0206
370/311
2016/0119900 A1* 4/2016 You ...................... H04L 5/0094
370/336

OTHER PUBLICATIONS

LG Electronics, "Performance evaluation of DMRS pattern for new carrier type," R1-130251, 3GPP TSG RAN WG1 Meeting #72, St Julian's, Malta, Jan. 28-Feb. 1, 2013, see pp. 1-6, and figure 1.
NTT Docomo, "Views on DL RS for New Carrier Type," R1-130397, 3GPP TSG RAN WG1 Meeting #72, St Julian's, Malta, Jan. 28-Feb. 1, 2013, see pp. 1-3, and figure 1.

* cited by examiner

FIG. 4
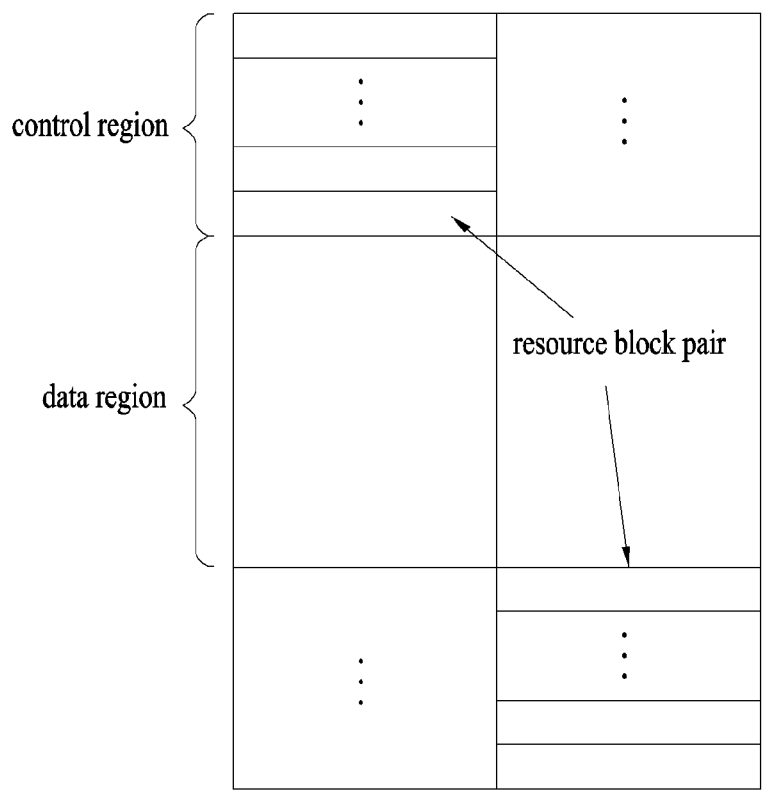
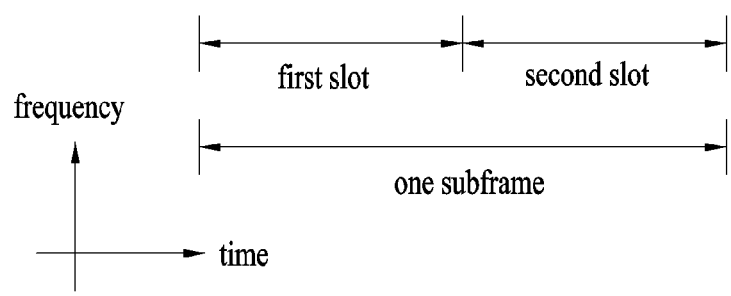

FIG. 13
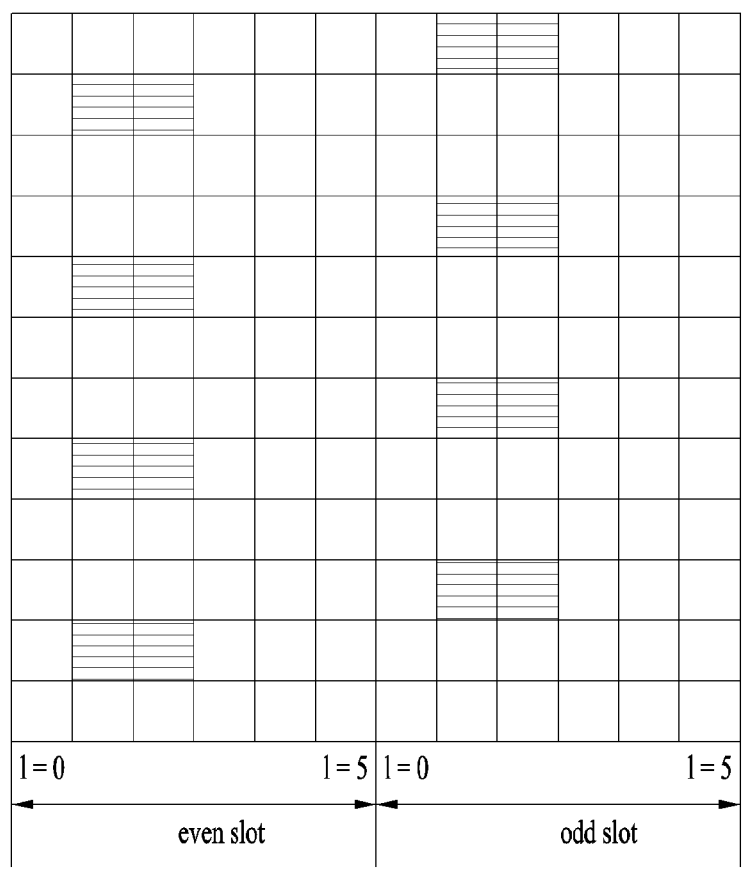
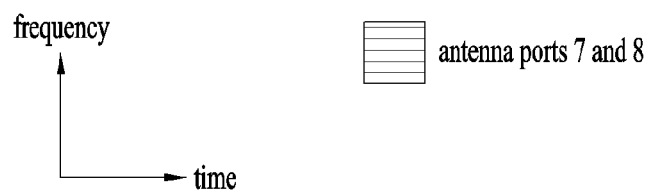

FIG. 15
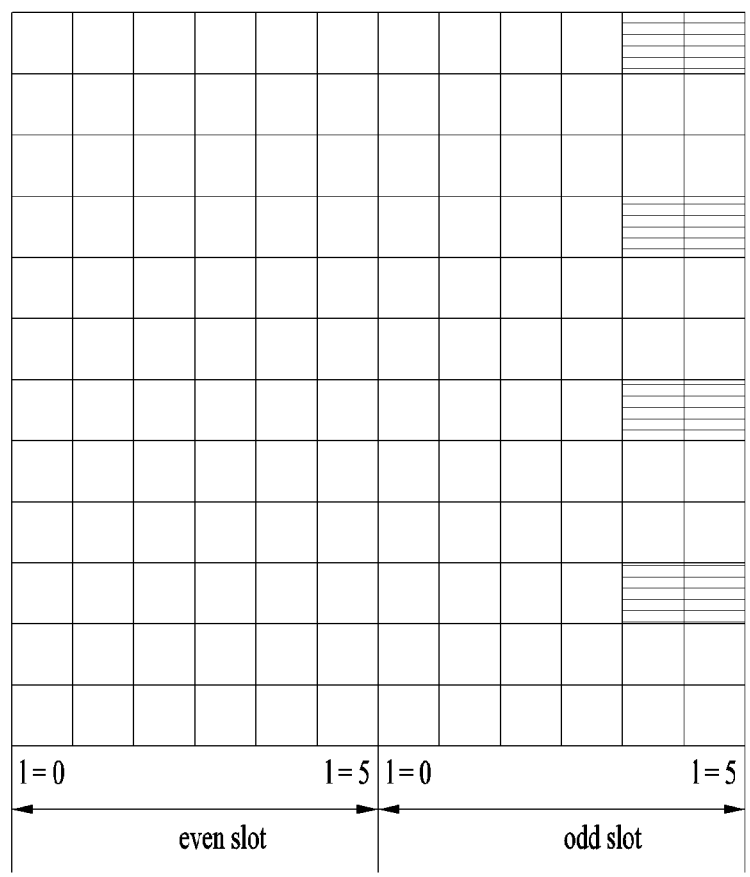
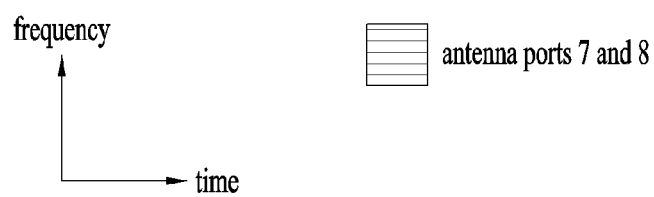

METHOD FOR PUNCTURING UE SPECIFIC REFERENCE SIGNAL IN RADIO ACCESS SYSTEM SUPPORTING NEW CARRIER TYPE AND APPARATUS SUPPORTING SAME

This application is a 35 USC §371 National Stage entry of International Application No. PCT/KR2014/004144 filed on May 9, 2014, and claims priority to U.S. Provisional Application No. 61/821,248 filed on May 9, 2013, all of which are hereby incorporated by reference in their entireties as if fully set forth herein.

TECHNICAL FIELD

The present invention relates to a wireless access system supporting a new carrier type, and more particularly, to methods for puncturing UE specific reference signals if a frequency resource to which a UE specific reference signal is transmitted is overlapped with a frequency resource to which a synchronization signal is transmitted, and apparatuses for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method for efficiently transmitting data in a radio access system that supports a new carrier type (NCT).

Another object of the present invention is to provide various methods for puncturing a UE specific reference signal if the UE specific reference signal is overlapped with a synchronization signal in an NCT environment.

Still another object of the present invention is to provide a subframe structure for transmitting a synchronization signal and a UE specific reference signal.

Further still another object of the present invention is to provide apparatuses for supporting the aforementioned methods and subframe structure.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to methods for puncturing UE specific reference signals if a frequency resource to which a UE specific reference signal is transmitted is overlapped with a frequency resource to which a synchronization signal in a wireless access system supporting a new carrier type, and apparatuses for supporting the same.

In one aspect of the present invention, a method for enabling a base station to puncture UE specific reference signals (UE-RS) in a wireless access system supporting a new carrier type (NCT) comprises the steps of allocating first resource elements (REs) for transmitting a synchronization signal at a specific subframe; allocating second REs for transmitting the UE-RS at the specific subframe in accordance with UE-RS pattern; and puncturing overlapped second REs if the first REs are overlapped with the second REs in their positions. In this case, the base station manages a second cell for providing synchronization of a first cell which is the NCT, and the synchronization signal is allocated using odd numbered of resource blocks (RBs) at the specific subframe. At this time, the synchronization signal or a cell specific reference signal (CRS) may not be transmitted from a first cell or may be transmitted with a long period.

In another aspect of the present invention, a base station for puncturing UE specific reference signals (UE-RS) in a wireless access system supporting a new carrier type (NCT) comprises one or more antenna ports; and a processor configured to puncture the UE-RS. In this case, the processor is configured to allocate first resource elements (REs) for transmitting a synchronization signal at a specific subframe, allocate second REs for transmitting the UE-RS at the specific subframe in accordance with UE-RS pattern and puncture overlapped second REs if the first REs are overlapped with the second REs in their positions. At this time, the base station manages a second cell for providing synchronization of a first cell which is the NCT, and the synchronization signal is allocated using odd numbered of resource blocks (RBs) at the specific subframe. At this time, the synchronization signal or a cell specific reference signal (CRS) may not be transmitted from a first cell or may be transmitted with a long period.

As one aspect of the present invention, if the position of the first REs is overlapped with that of the second REs at the specific subframe, the second REs overlapped in the odd numbered of RBs are only punctured and the other second REs are not punctured.

Also, a first UE-RS and a second UE-RS are allocated to the second REs, and one of the first UE-RS and the second UE-RS allocated to the second REs adjacent to the synchronization signal is transmitted using an antenna port corresponding to rank 1 or rank 2.

Alternatively, a first UE-RS and a second UE-RS are allocated to the second REs, and a transmission position of the first UE-RS and the second UE-RS allocated to RB having the lowest index and a transmission position of the first UE-RS and the second UE-RS allocated to RB having the highest index among the odd numbered of RBs are exchanged with each other.

As another aspect of the present invention, if the position of the first REs is overlapped with that of the second REs at the specific subframe, the second REs are all punctured in the odd numbered of RBs.

As another aspect of the present invention, the base station transmits downlink data signals to rank 1 through the odd numbered of RBs.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First of all, downlink data can be transmitted and received efficiently in an NCT environment.

Second, if a UE specific reference signal is overlapped with a synchronization signal in an NCT environment, the UE specific reference signal is punctured by various methods, whereby downlink channel estimation performance of the UE can be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 4 illustrates a structure of an UpLink (UL) subframe;

FIG. 13 illustrates an example of a pattern of a UE specific reference signal used in a serving cell to which FDD extended CP is applied;

FIG. 15 illustrates another example of a pattern of a UE specific reference signal used in a serving cell to which extended CP is applied;

BEST MODE FOR CARRYING OUT THE INVENTION

Figure 1:
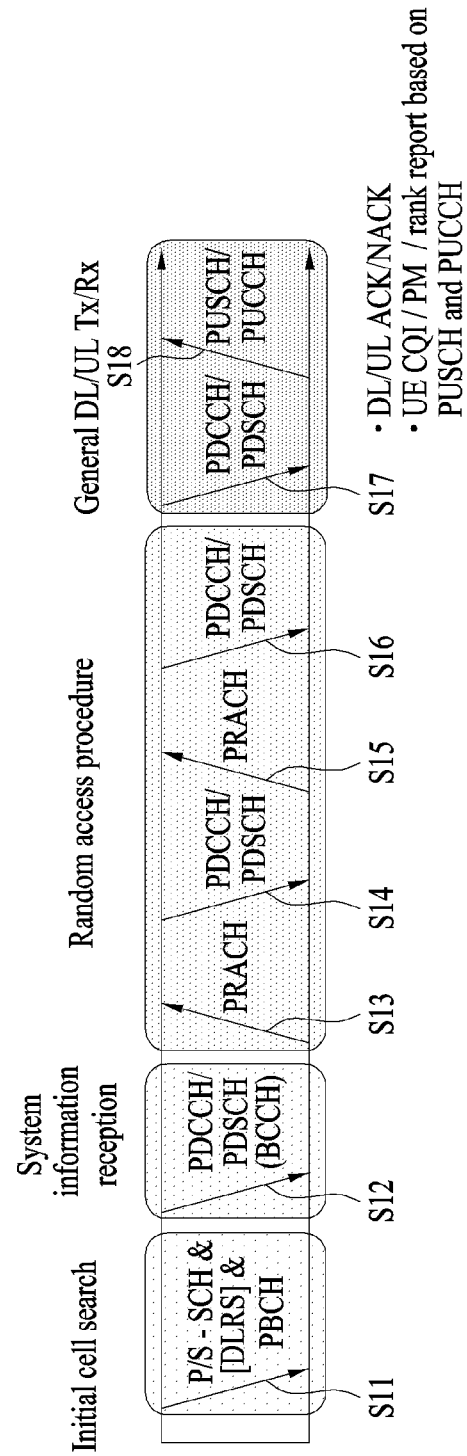
FIG. 1 illustrates physical channels and a general signal transmission method using the physical channels.

The present invention relates to methods for puncturing UE specific reference signals if a frequency resource to which a UE specific reference signal is transmitted is overlapped with a frequency resource to which a synchronization signal in a wireless access system supporting a new carrier type, and apparatuses for supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure. In addition, all of the terms disclosed by the present description can be explained based on the standard specification documents.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
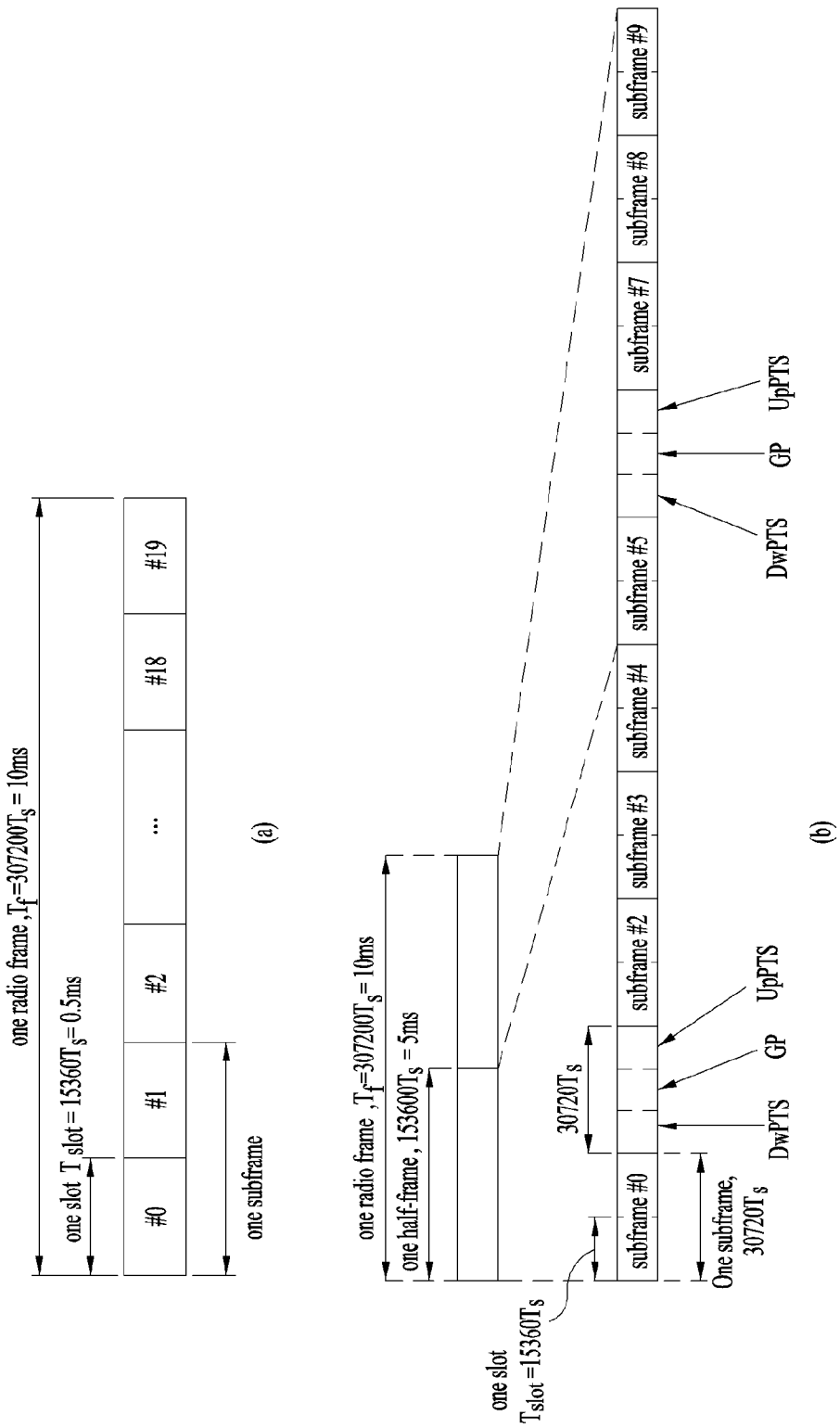
FIG. 2 illustrates radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f$=307200·$T_s$) long, including equal-sized 20 slots indexed from 0 to 19. Each slot is 0.5 ms ($T_{slot}$=15360·$T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s$=1/(15 kHz×2048)=3.2552×10$^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 5:
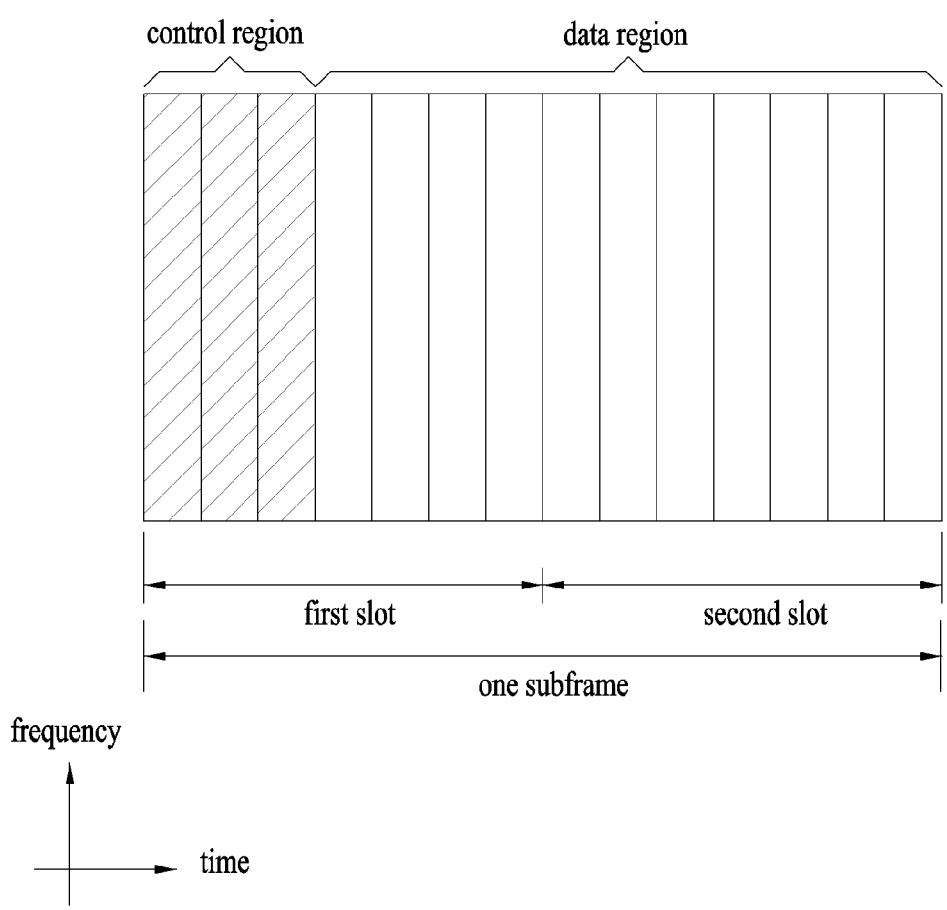
FIG. 5 illustrates a structure of a DL subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Carrier Aggregation (CA) Environment 1.2.1 CA Overview

A 3GPP LTE system (conforming to Rel-8 or Rel-9) (hereinafter, referred to as an LTE system) uses Multi-

TABLE 1

| | Normal cyclic prefix in downlink | | | Extended cyclic prefix in downlink | | |
|---|---|---|---|---|---|---|
| | | UpPTS | | | UpPTS | |
| | | Normal | Extended | | Normal | Extended |
| Special subframe configuration | DwPTS | cyclic prefix in uplink | cyclic prefix in uplink | DwPTS | cyclic prefix in uplink | cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
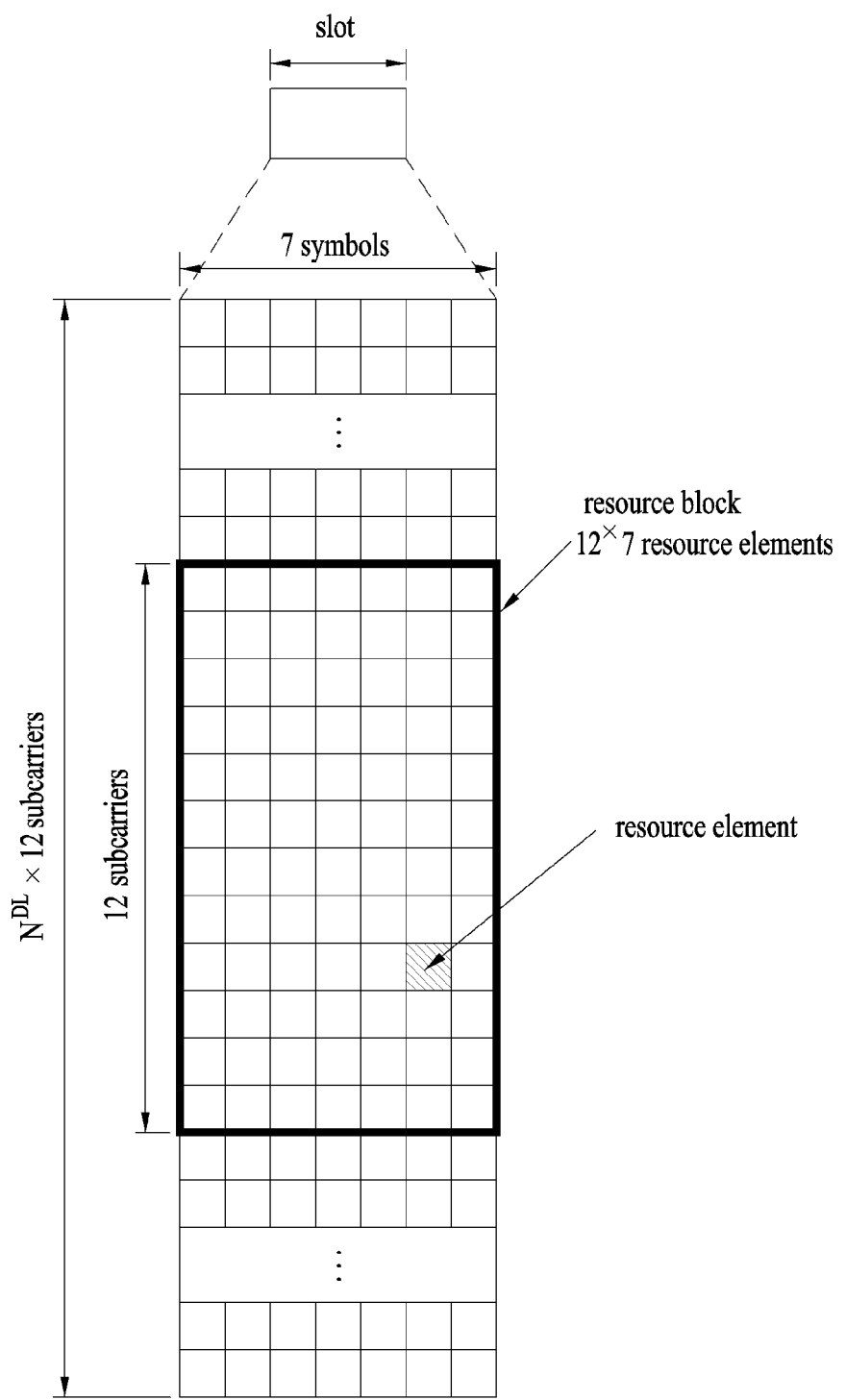
FIG. 3 illustrates a structure of a DownLink (DL) resource grid for the duration of one DL slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-hand multi-cell and inter-hand CA is referred to as inter-hand multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRC_ConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

1.2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
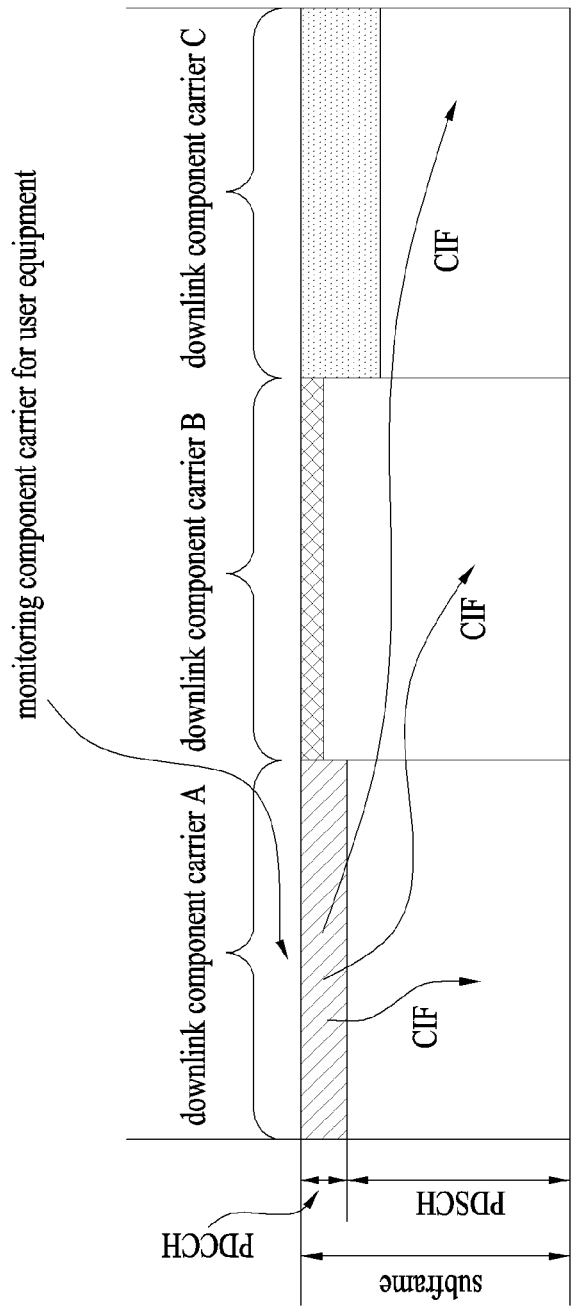
FIG. 6 illustrates a cross carrier-scheduled subframe structure in the LTE-A system.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

1.3 Physical Downlink Control Channel (PDCCH)

1.3.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.3.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |

TABLE 3-continued

| DCI Format | Description |
| --- | --- |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:
Transmission mode 1: Single antenna transmission
Transmission mode 2: Transmission diversity
Transmission mode 3: Open-loop codebook based precoding when the number of layer is greater than 1, Transmission diversity when the number of rank is 1
Transmission mode 4: closed-loop codebook based precoding
Transmission mode 5: Multi-user MIMO of transmission mode 4 version
Transmission mode 6: closed-loop codebook based precoding which is specifically limited for signal layer transmission
Transmission mode 7: precoding dose not based on codebooks only supporting single layer transmission (release 8)
Transmission mode 8: precoding dose not based on codebooks supporting maximum 2 layers (release 9)
Transmission mode 9: precoding dose not based on codebooks supporting maximum 8 layers (release 10)
Transmission mode 10: precoding dose not based on codebooks supporting maximum 8 layers, for CoMP use (release 11)

1.3.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.4 Reference Signal (RS)

Hereinafter, reference signals are explained, which are used for the embodiments of the present invention.

Figure 7:
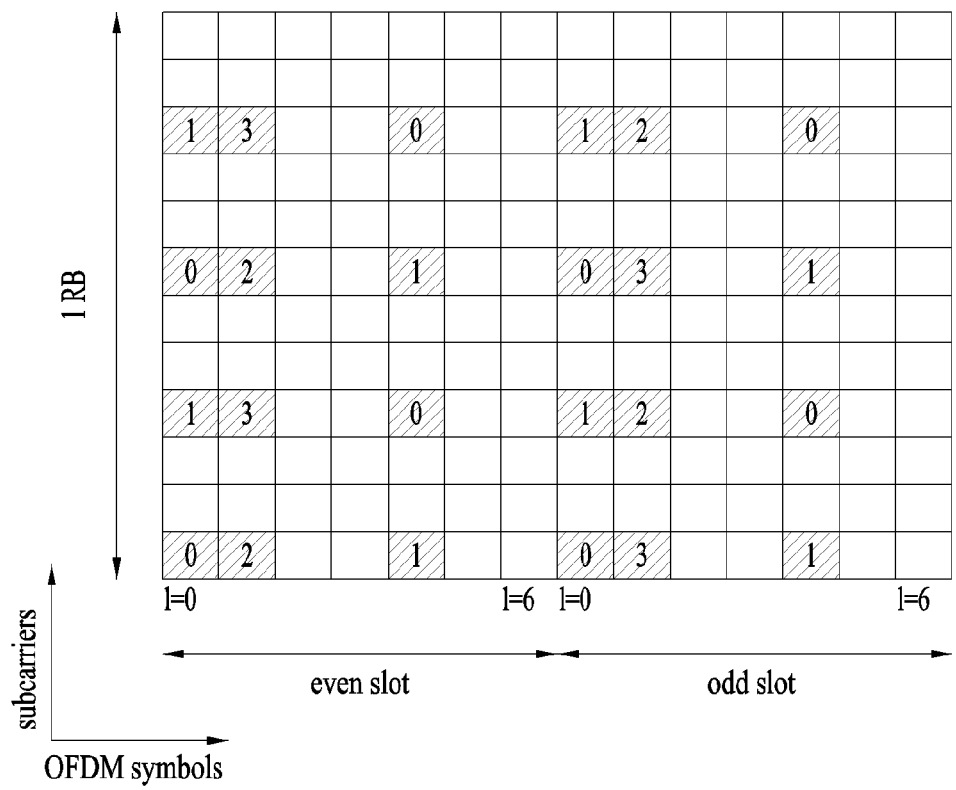
FIG. 7 illustrates a subframe to which cell specific reference signals (CRSs) are allocated.

FIG. 7 illustrates a subframe to which cell specific reference signals (CRSs) are allocated, which may be used in embodiments of the present disclosure.

FIG. 7 represents an allocation structure of the CRS in case of the system supporting 4 antennas. Since CRSs are used for both demodulation and measurement, the CRSs are transmitted in all DL subframes in a cell supporting PDSCH transmission and are transmitted through all antenna ports configured at an eNB.

More specifically, CRS sequence is mapped to complex-modulation symbols used as reference symbols for antenna port p in slot $n_s$.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 8:
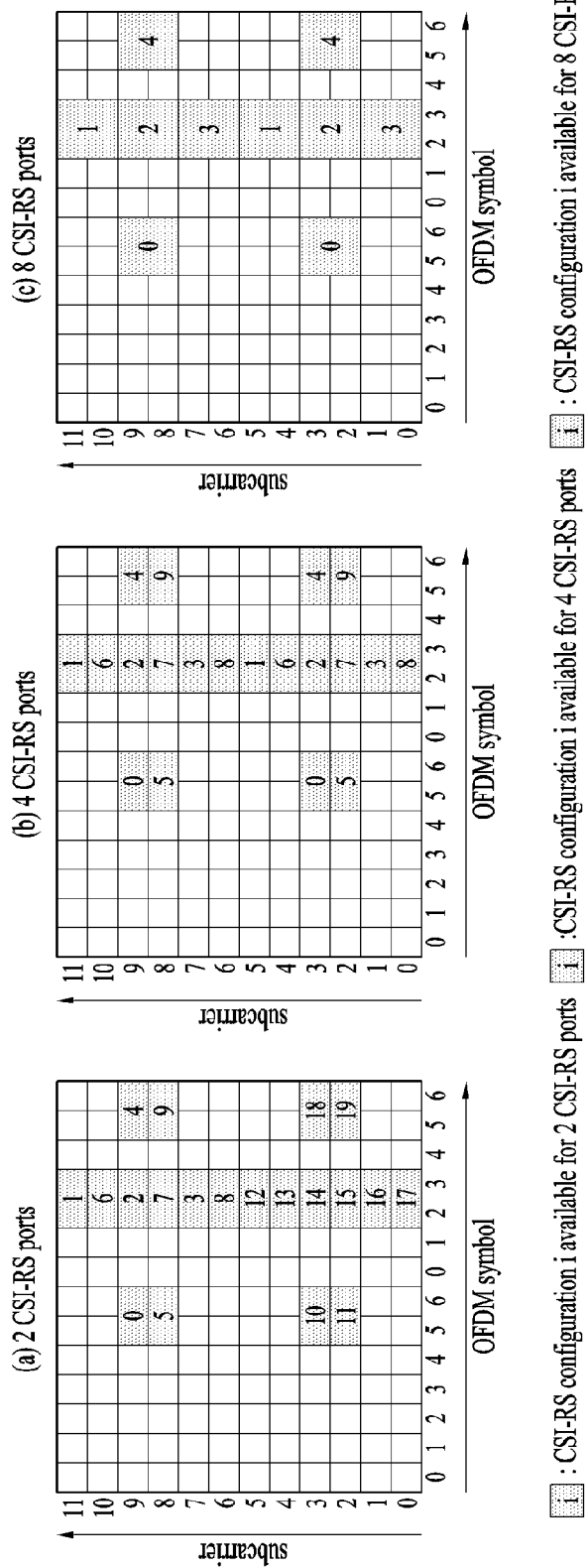
FIG. 8 illustrates an example of subframes to which channel state information reference signals (CSI-RSs) are allocated according to the number of antenna ports.

FIG. 8 illustrates channel state information reference signal (CSI-RS) configurations allocated according to the number of antenna ports, which may be used in embodiments of the present disclosure.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence is mapped to complex modulation symbols used as RSs on antenna port p.

FIG. 8(a) illustrates 20 CSI-RS configurations 0 to 19 available for CSI-RS transmission through two CSI-RS ports among the CSI-RS configurations, FIG. 8(b) illustrates 10 available CSI-RS configurations 0 to 9 through four CSI-RS ports among the CSI-RS configurations, and FIG. 8(c) illustrates 5 available CSI-RS configurations 0 to 4 through 8 CSI-RS ports among the CSI-RS configurations.

The CSI-RS ports refer to antenna ports configured for CSI-RS transmission. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured.

Meanwhile, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration is assigned and (2) a CSI-RS configuration varying according to a CSI-RS configuration number, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 8 shows CSI-RS subframe configuration $I_{CSI-RS}$ according to TCSI-RS and ΔCSI-RS.

TABLE 8

| CSI-RS-Subframe Config ICSI-RS | CSI-RS periodicity TCSI-RS (subframes) | CSI-RS subframe offset ΔCSI-RS (subframes) |
| --- | --- | --- |
| 0-4 | 5 | ICSI-RS |
| 5-14 | 10 | ICSI-RS − 5 |
| 15-34 | 20 | ICSI-RS − 15 |
| 35-74 | 40 | ICSI-RS − 35 |
| 75-154 | 80 | ICSI-RS − 75 |

Subframes satisfying the following Equation 1 are subframes including CSI-RSs.

[Equation 1]

$$(10n_f + \lfloor n_s/2 \rfloor - \Delta_{CSI-RS}) \bmod T_{CSI-RS} = 0$$

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

Figure 9:
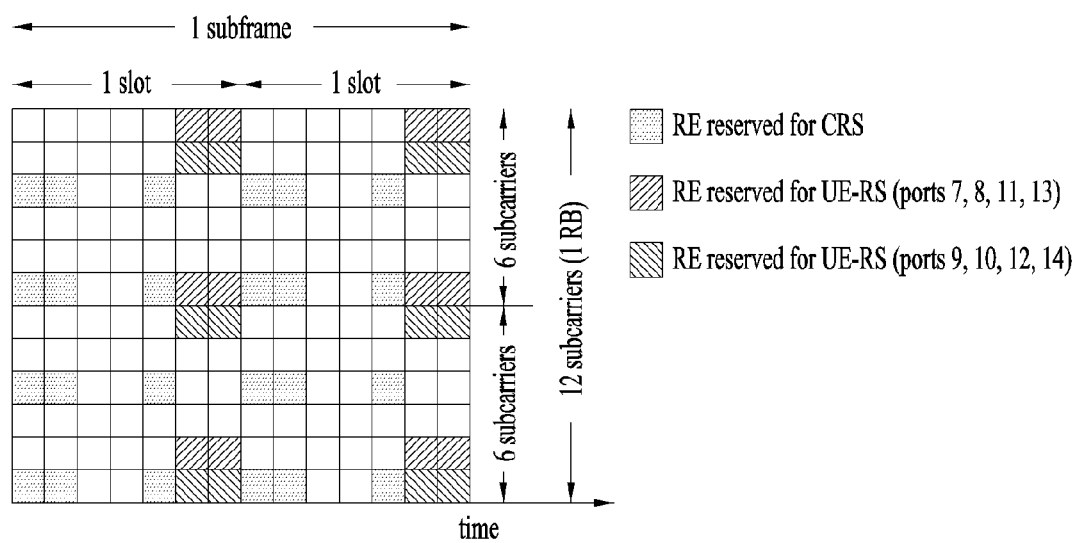
FIG. 9 illustrates an example of a subframe to which UE-specific Reference Signals (UE-RSs) are allocated.

FIG. 9 illustrates an example of a subframe to which UE-RSs are allocated, which may be used in embodiments of the present disclosure.

Referring to FIG. 9, the subframe illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 9, in a PRB having frequency-domain index nPRB assigned for PDSCH transmission with respect to p=7, p=8, or p=7, 8, . . . , υ+6, a part of UE-RS sequence r(m) is mapped to complex-valued modulation symbols $a_{k,l}^{(p)}$ in a subframe according to the following equation 10.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in an RB pair are the same with respect to a UE-RS port regardless of a UE or a cell.

As a result, the number of DMRS REs in an RB to which a PDSCH for a specific UE in a specific subframe is mapped is the same. Notably, in RBs to which the PDSCH for different UEs in the same subframe is allocated, the number of DMRS REs included in the RBs may differ according to the number of transmitted layers.

1.5 Synchronization Signal

A Synchronization Signal (SS) is categorized into a Primary Synchronization Signal (PSS) and a Secondary Synchronization Signal (SSS). The SS is a signal used for synchronization acquisition and cell search between a UE and an eNB.

Figure 10:
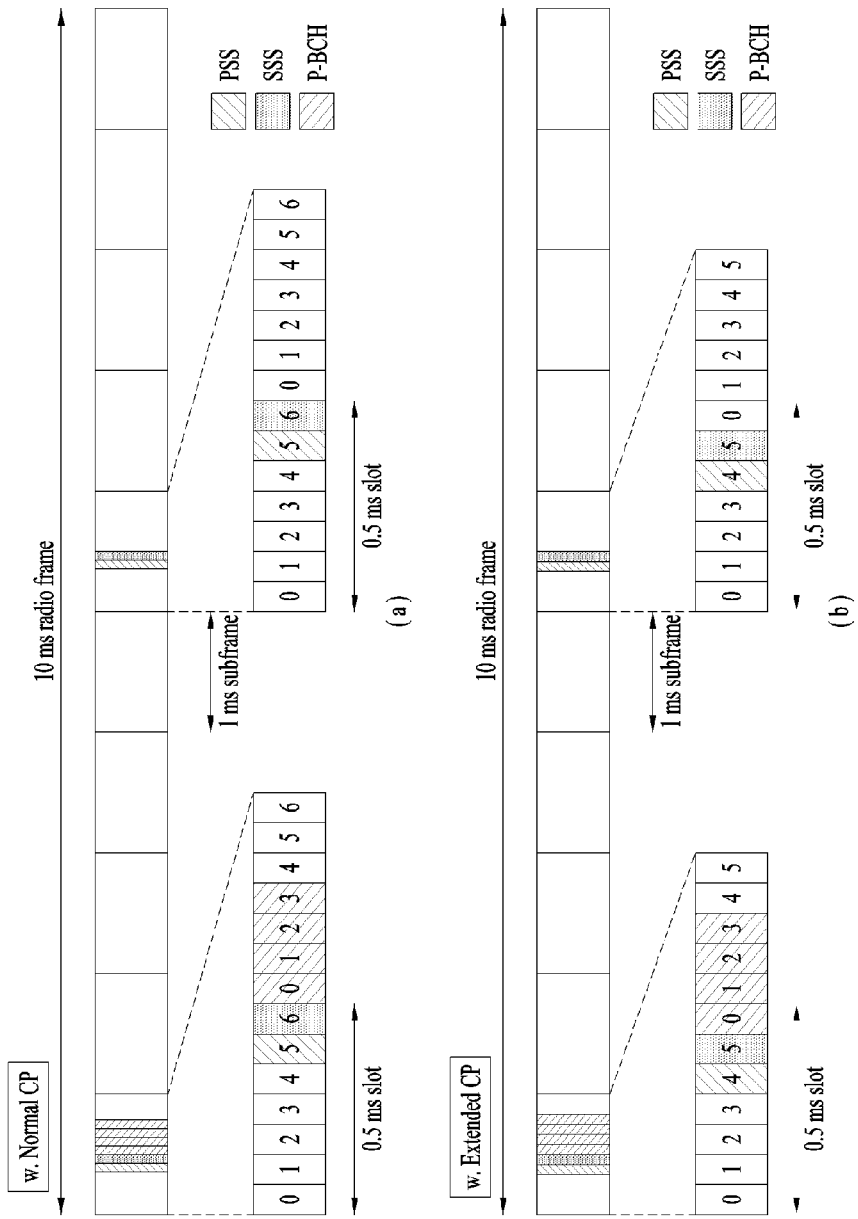
FIG. 10 illustrates an example of a frame structure indicating a position to which a synchronization signal is transmitted.

FIG. 10 illustrates an example of a frame structure in which SS transmission positions are indicated. Particularly, FIG. 10(a) and FIG. 10(b) illustrate frame structures for SS transmission in systems using a normal Cyclic Prefix (CP) and an extended CP, respectively.

An SS is transmitted in the second slot of subframe number 0 and the second slot of subframe number 5, in consideration of a GSM frame length of 4.6 ms for facilitation of inter-Radio Access Technology (RAT) measurement. A boundary of the corresponding radio frame may be detected through an SSS.

Referring to FIG. 10(a) and FIG. 10(b), a PSS is transmitted on the last OFDM symbols of slot numbers 0 and 5 and an SSS is transmitted on an OFDM symbol immediately before the PSS. The SS may transmit a total of 504 physical cell IDs by a combination of 3 PSSs and 168 SSSs. In addition, the SS and a PBCH are transmitted within middle 6 RBs of a system bandwidth so that the UE may detect or decode the SS and PBCH irrespective of the size of a transmission bandwidth.

A transmit diversity scheme of the SS uses only a single antenna port. That is, a single antenna transmission scheme or a UE transparent transmission scheme (e.g. Precoding Vector Switching (PVS), Time Switched Transmit Diversity (TSTD), or Cyclic Delay Diversity (CDD)) may be used.

1.5.1 Primary Synchronization Signal (PSS)

A length-63 Zadoff-Chu (ZC) sequence is defined in the frequency domain and is used as a sequence of the PSS. The ZC sequence is defined by Equation 2.

$$d_u(n) = e^{-j\frac{\pi u n(n+1)}{N_{ZC}}}$$ [Equation 2]

In Equation 2, Nzc represents length-63 of the ZC sequence and du(n) represents a PSS sequence according to a root index u. A sequence element corresponding to a Direct Current (DC) subcarrier, n=31, is punctured.

Among middle 6 RBs (=72 subcarriers) of bandwidth, 9 remaining subcarriers carry a value of always 0 to facilitate filter design for performing synchronization. To define a total of three PSSs, values of u=25, 29, and 34 may be used in Equation 2. In this case, since u=29 and u=34 have a conjugate symmetry relation, two correlations may be simultaneously performed. Here, conjugate symmetry indicates the relationship of the following Equation 3. A one-shot correlator for u=29 and u=34 may be implemented using the characteristics of conjugate symmetry so that the entire amount of calculation can be reduced by about 33.3%.

$$d_u(n)=(-1)^n d_{N_{ZC}-u}(n))^*, \text{ when } N_{ZC} \text{ is even number.}$$

$$d_u(n)=(d_{N_{ZC}-u}(n)), \text{ when } N_{ZC} \text{ is odd number.}$$ [Equation 3]

1.5.2 Secondary Synchronization Signal (SSS)

An SSS is generated by interleaving and concatenating two m-sequences of length-31. In this case, 168 cell group IDs may be identified by combining the two sequences. As the sequence of the SSS, the m-sequences are robust in a frequency selective environment and can reduce the amount of calculation by high-speed m-sequence transform using fast Hadamard transform. In addition, configuration of the SSS using two short codes has been proposed to reduce the amount of calculation by a UE.

Figure 11:
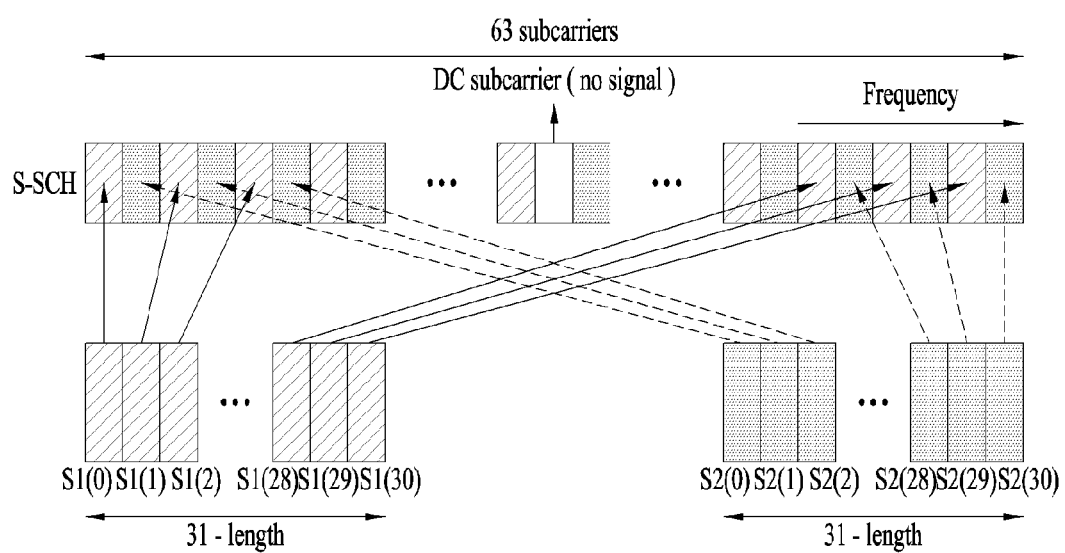
FIG. 11 illustrates one of methods for generating a secondary synchronization signal.

FIG. 11 illustrates an SSS generation method.

Referring to FIG. 11, it may be appreciated that two m-sequences defined in a logical region are interleaved and mapped in a physical region. For example, if two m-sequences used to generate an SSS code are defined as S1 and S2, when the SSS of subframe index 0 transmits a cell group ID by a combination of the two sequences of (S1, S2), the SSS of subframe index 5 transmits the cell group ID by swapping the sequences for (S2, S1), so that a boundary of a 10 ms frame can be distinguished. The SSS code used in this case is generated using a polynomial of $x^5+x^2+1$ and a total of 31 codes may be generated through different circular shifts.

To improve reception performance, two different PSS based sequences are defined and are scrambled to the SSS. Here, the PSS based sequences are scrambled to S1 and S2 as different sequences. Next, an S1 based scrambling code is defined and is scrambled to S2. In this case, SSS codes are swapped in units of 5 ms but PSS based scrambling codes are not swapped. The PSS based scrambling code is defined as 6 cyclic shift versions according to a PSS index in an m-sequence generated from a polynomial of $x^5+x^3+1$ and the S1 based scrambling code is defined as 8 cyclic shift versions according to an S1 index in an m-sequence generated from a polynomial of $x^5+x^4+x^2+x^1+1$.

2. New Carrier Type (NCT)

In LTE release 8/9/10/11 systems which are legacy systems, reference signals and control channels, such as a cell specific reference signal (CRS), a primary synchronization signal (PSS), a secondary synchronization signal (SSS), a PDCCH and a PBCH, are transmitted through a downlink component carrier.

However, in a next wireless access system, a downlink component carrier through which some or all of the CRS, the PSS, the SSS, the PDCCH and the PBCH are not transmitted due to a solution of an interference problem among a plurality of cells and improvement of carrier extendibility may be introduced. In the embodiments of the present invention, such a carrier will be defined as an extension carrier or a new carrier type (NCT).

The NCT described in the present invention may be one of Scells in case that a base station supports CA, and in case that the base station supports CoMP, the NCT may be a carrier or serving cell provided for data cooperative transmission from a neighboring base station. Also, the NCT is a small cell, and may be a cell synchronized with a reference cell (for example, P cell).

2.1 Method for Measuring a Radio Resource in NCT

If carrier aggregation (CA) is supported in a radio access system, each carrier (that is, serving cell) may perform scheduling for PDSCH/PUSCH through a PDCCH in a self-scheduling manner. Alternatively, each carrier (serving cell) may perform scheduling for PDSCH/PUSCH of any one serving cell through a PDCCH transmitted through another serving cell in a cross-carrier scheduling manner (see section 1.2). In the embodiments of the present invention, the term, carrier used for CA, may be used to be equivalent to the serving cell.

In order that a random serving cell is added to CA as a secondary carrier or secondary serving cell, a UE should perform neighbor cell measurement. Generally, neighbor cell measurement is performed using a common reference signal (CRS), and may be referred to as radio resource measurement.

The carriers (that is, serving cells) used for CA may be categorized into a synchronized carrier and a non-synchronized carrier.

The non-synchronized carrier means a carrier that assumes itself as a synchronization reference carrier for synchronization. That is, in case of the non-synchronized carrier, it is required to obtain synchronization by transmitting synchronization signals (e.g., PSS/SSS, etc.) required for synchronization acquisition, whereby the UE may acquire synchronization by itself.

On the other hand, in case of the synchronized carrier, transmission of synchronization signals required for synchronization is not required. Instead, neighboring carriers (or serving cells) of the same frequency band, which have similar propagation and channel properties, are configured as synchronization reference carriers (or reference cells), and may use synchronization information of the synchronization reference carrier as their synchronization information. That is, the synchronized carrier is a carrier synchronized with another carrier not itself, and means a carrier that assumes another carrier as the synchronization reference carrier for acquiring synchronization.

In order to acquire synchronization through the synchronized carrier, the UE may perform synchronization tracking for the synchronized carrier by receiving a radio signal (e.g., PSS, SSS or RS) of the synchronization reference carrier for a specific time period (e.g., specific subframe having a specific period) on the synchronized carrier. At this time, the UE may be configured to stop a series of operations related to downlink data/signal reception on the synchronized carrier for the corresponding time period.

The UE may acquire and maintain synchronization and perform reference signal received power (RSRP), reference signal received quality (RSRQ), path loss measurement (PLM), etc. for the synchronization reference cell.

Synchronization and RRM methods for the synchronized carrier and the synchronization reference carrier may be provided as follows.

(1) Method 1: The UE operated at the synchronized carrier acquires synchronization and performs RRM (RSRP, RSRQ, path loss) measurement by using the synchronization reference carrier.

(2) Method 2: The UE operated at the synchronized carrier maintains synchronization by using the synchronization reference carrier, and performs RRM (RSRP, RSRQ, path loss) measurement by using its CSI-RS or CRS.

(3) Method 3: The UE operated at the synchronized carrier maintains synchronization and RRM by using the synchronization reference carrier, and at the same time performs RRM by using its CSI-RS or CRS.

(4) Method 4: The UE operated at the synchronized carrier maintains synchronization by using the synchronization reference carrier, performs RSRP measurement or RSRP of RRM and path loss measurement by using the synchronization reference carrier or performs RSRQ measurement or RSRQ and path loss measurement by using its CSI-RS or CRS.

Since acquisition and/or synchronization of a target cell for RRM should be acquired for RRM, the reference cell of the synchronized carrier may be selected among cells where the UE performs RRM. On the contrary, the UE is allowed to perform RRM for the cell indicated as the reference cell of the synchronized carrier. Also, RRM of the synchronized carrier may be configured to be performed for the cell which is the synchronization reference.

In the embodiments of the present invention, the synchronized carrier may be used to refer to a synchronized serving cell, a synchronized cell, a new carrier type cell (NTC), or a first cell. Also, the non-synchronized carrier may be used to refer to a synchronization reference carrier, a synchronization carrier, a synchronization reference serving cell, a synchronization reference cell, or a second cell.

2.2 Method for Adding Synchronized Cell to CA

Hereinafter, for convenience of description, the synchronized carrier will be referred to as a first cell, and the synchronization reference carrier will be referred to as a second cell.

In order that the synchronized cell (that is, first cell) is aggregated to CA as Scell, it is required that the UE should perform RRM RRMor cell measurement. However, since the first cell does not transmit a synchronization related signal (e.g., PSS/SSS, CRS, etc.), the UE cannot perform RRM directly for the first cell.

Therefore, the UE may determine whether to aggregate the first cell to CA as the Scell by measuring the second cell instead of the first cell. In this case, the base station may configure or activate the first cell as the SCell in accordance with the result of measurement of the second cell from the UE as mentioned in the following methods:

(1) Method 1: independent configuration/activation of the first cell;

(2) Method 2: simultaneous configuration of the first cell and the second cell;

(3) Method 2-1: simultaneous configuration of the first cell and the second cell and independent activation of the first cell and the second cell; and (4) Method 2-2: simultaneous configuration of the first cell and the second cell and always simultaneous activation of the first cell and the second cell.

Also, when the first cell is configured and/or activated as the Scell, the base station may notify the UE that the corresponding cell is the first cell, or when the base station commands the UE to perform RRM of the first cell, the base station may transmit information on the first cell to the UE together with the command.

2.2.1 CP Definition of First Cell and Second Cell

If the first cell which is the synchronized cell and the second cell which is the synchronization reference cell are configured together, a method for configuring a CP length will be described.

If a CP length applied to the second cell is configured to be longer than that of the first cell, even though timing synchronization is acquired by the second cell, the UE cannot convince that the corresponding timing synchronization is equally applied to even the first cell. Therefore, combinations of the CP lengths applicable to the first cell and the second cell may be provided as follows:

(1) method A: second cell normal CP and first cell normal CP;

(2) method B: second cell normal CP and first cell extended CP; and (3) method C: second cell extended CP and first cell extended CP.

In this case, the CP lengths of the second cell and the first cell are distinctively configured to be the same as each other. That is, the method A or the method C is preferably provided.

2.2.2 Definition of Cell ID of First Cell

As described in the section 1.5, the maximum number of cell IDs managed by the base station may be 504. At this time, as serving cells allocated to each UE are increased due to CA and NCT is introduced, cell IDs may be insufficient. Therefore, a method for solving a problem of cell deployment, which may occur due to insufficient cell IDs, will be described hereinafter.

If the second cell which is the synchronization reference cell and the first cell which is the synchronized cell are activated by being configured together, independent cell ID may not be given to the first cell. For example, scrambling sequence of PDSCH, DM RS and CSI-RS, each of which uses cell ID as a parameter, may be initialized in such a manner that the second cell and the first cell are initialized to the same value using the same parameter as each other.

In more detail, for initialization of the scrambling sequence of the PDSCH transmitted from the first cell, scrambling sequence initialization of the PDSCH corresponding to $q \in \{0,1\}$th codeword may be expressed by the following Equation 4.

$$c_{init} = \{n_{RNTI} \cdot 2^{14} + q \cdot 2^{13} + \lfloor n_s/2 \rfloor \cdot 2^9 + A \text{ for } PDSCH \quad \text{[Equation 4]}$$

In the Equation 4, A may be set to a value corresponding to cell ID of the second cell, a value corresponding to PCell ID, or a value set by a higher layer as a unique value, which substitutes for cell ID.

By application of the same principle, for initialization of the scrambling sequence of the DM RS, which is used in the first cell, the following Equation 5 may be expressed.

$$c_{init} = (\lfloor n_s/2 \rfloor + 1) \cdot (B+1) \cdot 2^{16} + n_{SCID} \quad \text{[Equation 5]}$$

In the Equation 5, B may be set to a value corresponding to cell ID of the second cell, a value corresponding to PCell ID, or a value set by a higher layer as a unique value, which substitutes for cell ID.

By application of the same principle, for initialization of the scrambling sequence of the CSI RS, which is used in the first cell, the following Equation 6 may be expressed.

$$c_{init} = 2^{10} \cdot (7 \cdot (n_s+1) + l + 1) \cdot (2 \cdot C + 1) + 2 \cdot C + N_{CP} \quad \text{[Equation 6]}$$

In the Equation 6, C may be set to a value corresponding to cell ID of the second cell, a value corresponding to PCell ID, or a value set by a higher layer as a unique value, which substitutes for cell ID.

2.2.3 Out of Synchronization 2.2.3.1 Definition of Out of Synchronization in LTE System In the LTE system, criteria for out-of-synchronization are defined as follows.

(1) The UE should monitor downlink quality on the basis of a cell-specific reference signal to detect downlink radio link quality of a Pcell.

(2) The UE should compare radio link quality with threshold values $Q_{out}$ and $Q_{in}$ to estimate radio link quality and monitor downlink radio link quality of the Pcell.

(3) The threshold value $Q_{out}$ is defined at a level that downlink radio link quality is not received reliably, and is also defined as a value corresponding to a block error rate of 10% of PDCCH transmission considering PCFICH including a transmission parameter.

(4) The threshold value $Q_{in}$ is defined at a level that downlink radio link quality is received more significantly and reliably than $Q_{out}$, and is also defined as a value corresponding to a block error rate of 2% of PDCCH transmission considering PCFICH including a transmission parameter.

2.2.3.2 Regarding Method 1

As described in the method 1 of the section 2.2, the first cell may be configured and activated independently from the second cell. At this time, the first cell becomes the SCell, and out-of-synch may be configured to follow the PCell. That is, the UE monitors out-of-synch for the PCell only, and regards all the SCells as out-of-synch if the PCell is out-of-synch. In addition, the first cell activated to the SCell may be deactivated in accordance with the result of RRM of the second cell.

2.2.3.3 Definition of Out-of-Sync in NCT

As a specific serving cell or component carrier does not transmit a legacy PDCCH, if a new type PDCCH (e.g., E-PDCCH) is transmitted without satisfaction of backward compatibility with the legacy system, criteria for determining out-of-synch will be required as follows:

(1) Method I: method for mapping downlink radio link quality into a hypothetical error rate of a new PDCCH after measuring downlink radio link quality by using the CSI-RS;

(2) Method II: method for mapping a CRS or CSI-RS of the second cell into a hypothetical error rate of a PDCCH by measuring the CRS or CSI-RS; and (3) Method III: method for mapping a DMRS used to demodulate a new type PDCCH into a hypothetical error rate of the new type PDCCH by measuring the DMRS.

In case of the second cell which is a non-synchronized cell, it is required to obtain synchronization by transmitting a signal (e.g., PSS/SSS, etc.) required for synchronization. This PSS/SSS may be transmitted at a specific subframe (subframe indexes 0 and 5) of a radio frame.

The RS used for demodulation of the PDSCH is categorized into a cell specific RS (CRS) and a UE specific RS (URS) depending on a transmission mode (TM). At this time, in the legacy LTE Rel-10 system, an FDD UE specific RS may be overlapped with a position of a symbol, to which the PSS/SSS is transmitted.

In this case, the URS is not transmitted in a time/frequency resource to which the PSS/SSS is transmitted, whereby collision of the PSS/SSS and downlink data may be avoided. However, PDSCH data are discarded in the time/frequency resource to which the PSS/SSS is transmitted.

Alternatively, the base station may transmit PDSCH data by reconfiguring the position of the URS at the subframe to which the PSS/SSS is transmitted.

2.3 UE specific RS in NCT

Figure 12:
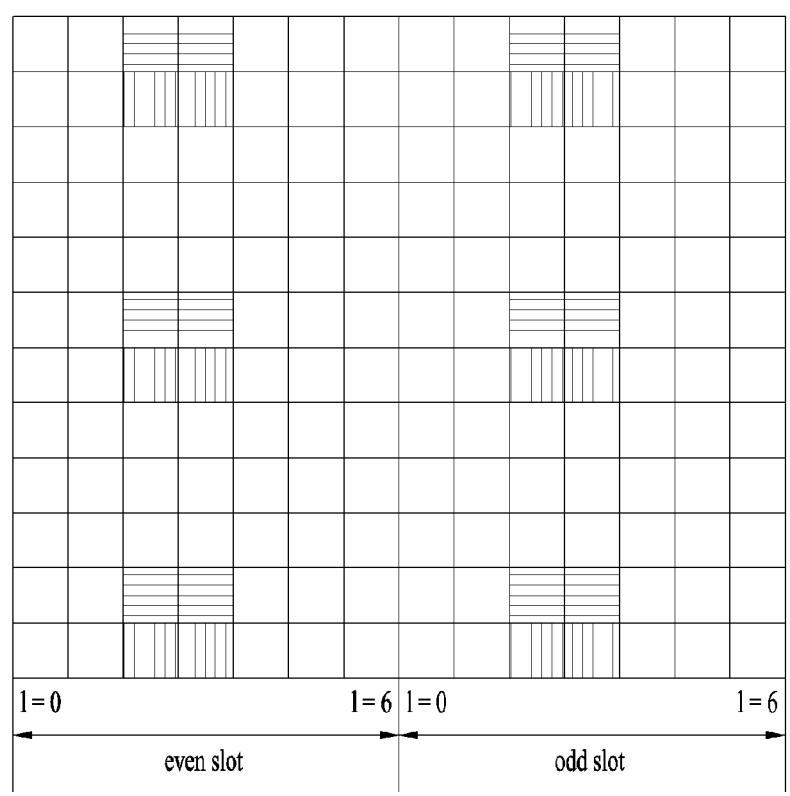
FIG. 12 illustrates an example of a pattern of a UE specific reference signal used in a serving cell to which FDD normal CP is applied.

FIG. 12 illustrates an example of a pattern of a UE specific RS used in a serving cell to which FDD normal CP is applied.

Referring to FIG. 12, a horizontal grid represents a UE-RS for antenna ports 7, 8, 11 and 13, and a vertical grid represents a UE-RS for antenna ports 9, 10, 12 and 14.

The UE-RS pattern shown in FIG. 12 may be configured to be useful at the subframe (e.g., subframes 0 and 5) only to which the PSS/SSS is transmitted, and more restrictively, may be configured to be useful at a frequency resource (e.g., 6 RBs) only to which the PSS/SSS is transmitted.

Also, if the CSI-RS is configured at the subframe to which the PSS/SSS is transmitted, and is overlapped with RE to which the UE-RS defined in FIG. 12 is transmitted, the corresponding CSI-RS may be configured so as not to be transmitted.

As another method, the subframe for transmitting the CSI RS is configured so as not to be overlapped with the subframe for transmitting the PSS/SSS, whereby collision in transmission RE positions between the CSI RS and the UE-RS may be avoided.

FIG. 13 illustrates an example of a pattern of a UE specific reference signal used in a serving cell to which FDD extended CP is applied.

Referring to FIG. 13, a horizontal grid represents a UE-RS for antenna ports 7 and 8, and a vertical grid represents a UE-RS for antenna ports 9, 10, 12 and 14.

The UE-RS pattern shown in FIG. 13 may be configured to be useful at the subframe (e.g., subframes 0 and 5) only to which the PSS/SSS is transmitted, and more restrictively, may be configured to be useful at a frequency resource (e.g., 6 RBs) only to which the PSS/SSS is transmitted.

Also, if the CSI-RS is configured at the subframe to which the PSS/SSS is transmitted, and is overlapped with RE to which the UE-RS defined in FIG. 13 is transmitted, the corresponding CSI-RS may be configured so as not to be transmitted.

As another method, the subframe for transmitting the CSI RS is configured so as not to be overlapped with the subframe for transmitting the PSS/SSS, whereby collision in transmission RE positions between the CSI RS and the UE-RS may be avoided.

2.3.1 Method for Allocating PDSCH Region in NCT

When NCT is configured and activated by the SCell, the base station may notify the UE of a start OFDM symbol position of the PDSCH through higher layer signaling. At this time, the base station may transmit a $1_{DataStart}$ parameter having a value from 1 to 4 through higher layer signaling to notify the UE of the start OFDM symbol position.

For example, if the value of $1_{DataStart}$ is set to 4, the UE specific RS (that is, UE-RS) of the OFDM symbol corresponding to l=3 in FIG. 12 is located before the OFDM symbol to which the PDSCH is actually transmitted. Also, the UE-RS pattern in FIGS. 12 and 13 may be defined in a frequency resource region only to which the PSS/SSS is transmitted. In this way, when the OFDM symbol for transmitting the UE-RS is located temporally before the OFDM symbol for starting transmission of the PDSCH within the same subframe, methods for the operation of the UE are as follows.

(1) Method 1: The UE assumes that the PDSCH is not transmitted.

(2) Method 2-1: The UE performs PDSCH demodulation by using the UE-RS of the OFDM symbol, which is transmitted prior to the OFDM symbol corresponding to the value of $1_{DataStart}$.

(3) Method 2-2: The UE performs PDSCH demodulation by using the UE-RS of the OFDM symbol, which is the same as the OFDM symbol corresponding to the value of $1_{DataStart}$ or is transmitted after the OFDM symbol corresponding to the value of $1_{DataStart}$. At this time, the corresponding UE assumes that the base station performs PDSCH transmission to a single antenna port.

(4) Method 2-3: The UE performs PDSCH demodulation by using the other UE-RS without using the UE-RS of the OFDM symbol subjected to CDM if the OFDM symbol corresponding to the value of $1_{DataStart}$ and the OFDM symbol subjected to CDM exist as the OFDM symbols prior to the value of $1_{DataStart}$. For example, when the value of $1_{Datastart}$ is set to 2 in FIG. 12, the UE performs PDSCH demodulation by using the UE-RS only of an odd-numbered slot without using the UE-RS of an even-numbered slot. At this time, an RE designed by the UE-RS may be used for PDSCH data transmission. As another method, the UE may puncture the UE-RS without transmitting the UE-RS.

(5) Method 3: The value of $1_{DataStart}$ set by the higher layer is limited to a value smaller than 4 by considering the position of the UE-RS. For example, the value of $1_{DataStart}$ may be set to 2 in case of normal CP and set to 1 in case of extended CP.

Since the UE-RS may be defined to be restricted to a frequency resource (e.g., center 6 RBs of bandwidth) to which the PSS/SSS is transmitted, the aforementioned methods may restrictively be applied to the frequency resource to which the PSS/SSS is transmitted. Also, the aforementioned methods may be applied to a downlink control channel transmitted through the PDSCH demodulated using the UE-RS.

That is, a method for defining a UE-RS useful only in a frequency resource to which a PSS/SSS is transmitted and allocating the UE-RS if a resource region to which the PSS/SSS is allocated is overlapped with a resource region to which the UE-RS is allocated and a method for transmitting and receiving downlink data will be described hereinafter.

If the frequency resource allocated through the downlink control channel (e.g., PDCCH or E-PDCCH) includes a boundary of the frequency resource to which the PSS/SSS is transmitted, the UE does not assume that the same precoding is applied to a PDSCH corresponding to a resource block group (RBG) including the boundary of the frequency resource with respect to the UE-RS used for demodulation of the PDSCH. At this time, 'the boundary of the frequency resource' means a portion that is divided into REs to which the PSS/SSS is allocated and REs to which the PSS/SSS is not allocated. For example, since downlink resource allocation is performed in a unit of RBG depending on system bandwidth, RBG that includes 6 RBs to which the PSS/SSS is transmitted may exist. Therefore, the boundary of the frequency resource means a boundary between RB to which the PSS/SSS is transmitted and RB to which the PSS/SSS is not transmitted, within one RBG. Therefore, the UE may assume that different precodings are applied to PDSCH signals transmitted from the corresponding RBG at the boundary of the frequency resource.

For example, RBG corresponding to 3 RBs including the boundary of the frequency resource to which the PSS/SSS is transmitted may be allocated to the UE. At this time, if 1 RB of the 3 RBs is included in the frequency resource to which the PSS/SSS is transmitted, it may be assumed that the other 2 RBs may use precoding different from that of 1 RB corresponding to the frequency resource to which the PSS/SSS is transmitted. Therefore, when the UE performs channel estimation by using the UE-RS, the UE cannot perform channel estimation through a channel estimation method (e.g., interpolation) that uses the UE-RS corresponding to 2 RBs and the UE-RS corresponding to 1 RB. That is, the UE should perform channel estimation independently between RBs on the basis of the boundary of the frequency resource. Generally, since channel estimation is performed in a unit of PRB bundling if the UE-RS is used, channel estimation may be performed in a unit of RB.

As another method, only PDSCH transmission of rank 1 may be allowed on the assumption that the same precoding is applied to RBG including the boundary of the frequency resource to which the PSS/SSS is transmitted. That is, transmission of the UE-RS subjected to code division multiplexing (CDM) is required for transmission of high rank but UE-RS patterns of RBs within the RBG including the boundary may be different from each other, whereby CDM cannot be used and thus transmission of rank 1 may only be allowed.

Figure 14:
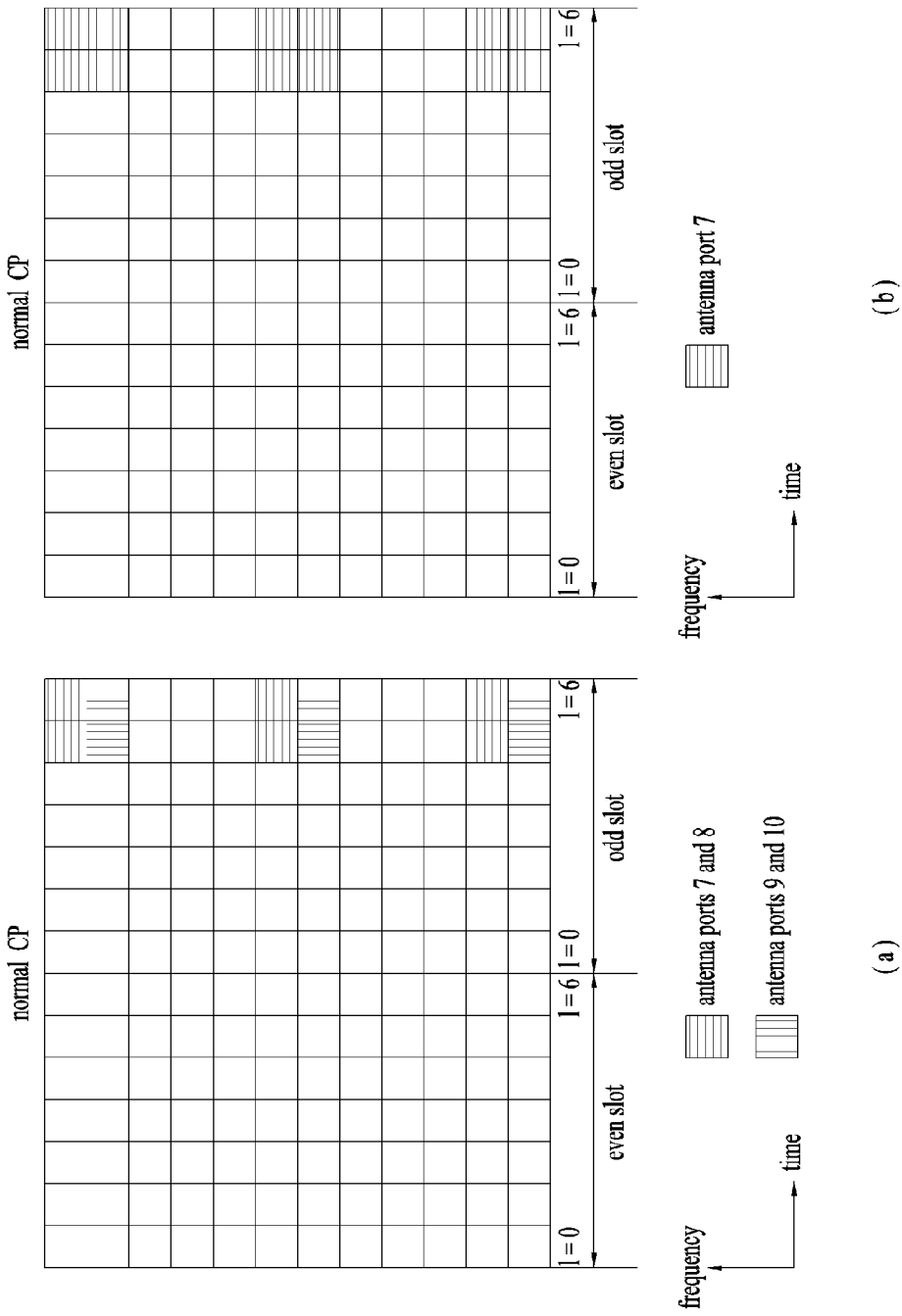
FIG. 14 illustrates another example of a pattern of a UE specific reference signal used in a serving cell to which normal CP is applied.

FIG. 14 illustrates another example of a pattern of a UE specific reference signal used in a serving cell to which normal CP is applied, and FIG. 15 illustrates another example of a pattern of a UE specific reference signal used in a serving cell to which extended CP is applied.

Referring to FIG. 14, the UE-RS overlapped with the position of the PSS/SSS in the frequency resource to which the PSS/SSS is transmitted is not transmitted by puncturing, and PDSCH demodulation for the corresponding frequency resource may be performed using the UE-RS of the odd numbered slot as shown in FIGS. 14 and 15. FIG. 14(a) illustrates that 4 antenna ports 7, 8, 9 and 10 for transmitting the UE-RS are defined in normal CP, and FIG. 14(b) illustrates that a single antenna port 7 is defined in normal CP.

In case of FIG. 14(a), the antenna port 7 and the antenna port 8 are multiplexed into the antenna port 9 and the antenna port 10 by CDM. Also, the antenna port 7 and the antenna port 8 are multiplexed into the antenna port 9 and the antenna port 10 by FDM. At this time, the UE may perform transmission to reach rank 4 by using 4 antenna ports. Also, as another method, the PDSCH transmitted to the corresponding RBs (that is, RBG) may be limited to rank 1.

Since the single antenna port is defined in FIG. 14(b), rank 1 transmission may only be performed.

In FIG. 15, antenna ports 7 and 8 multiplexed by CDM in extended CP are defined, and the UE may perform transmission to reach rank 2 by using the antenna ports.

In case of the UE-RS pattern applied to the subframe to which the PSS/SSS is transmitted as shown in FIGS. 14 and 15, RS density is lower than the UE-RS pattern of the subframe to which the PSS/SSS is not transmitted. Therefore, transmission power of the UE-RS may be increased to improve PDSCH demodulation performance of the UE. For example, the UE may assume that a ratio of a PDSCH EPRE and a UE-RS EPRE with respect to OFDM symbol to which the UE-RS is transmitted is −3 dB if the number of layers transmitted to the UE is 2 or less, and may assume that the ratio is −6 dB if the number of layers transmitted to the UE is more than 2. In this case, the EPRE means energy per resource element.

Figure 16:
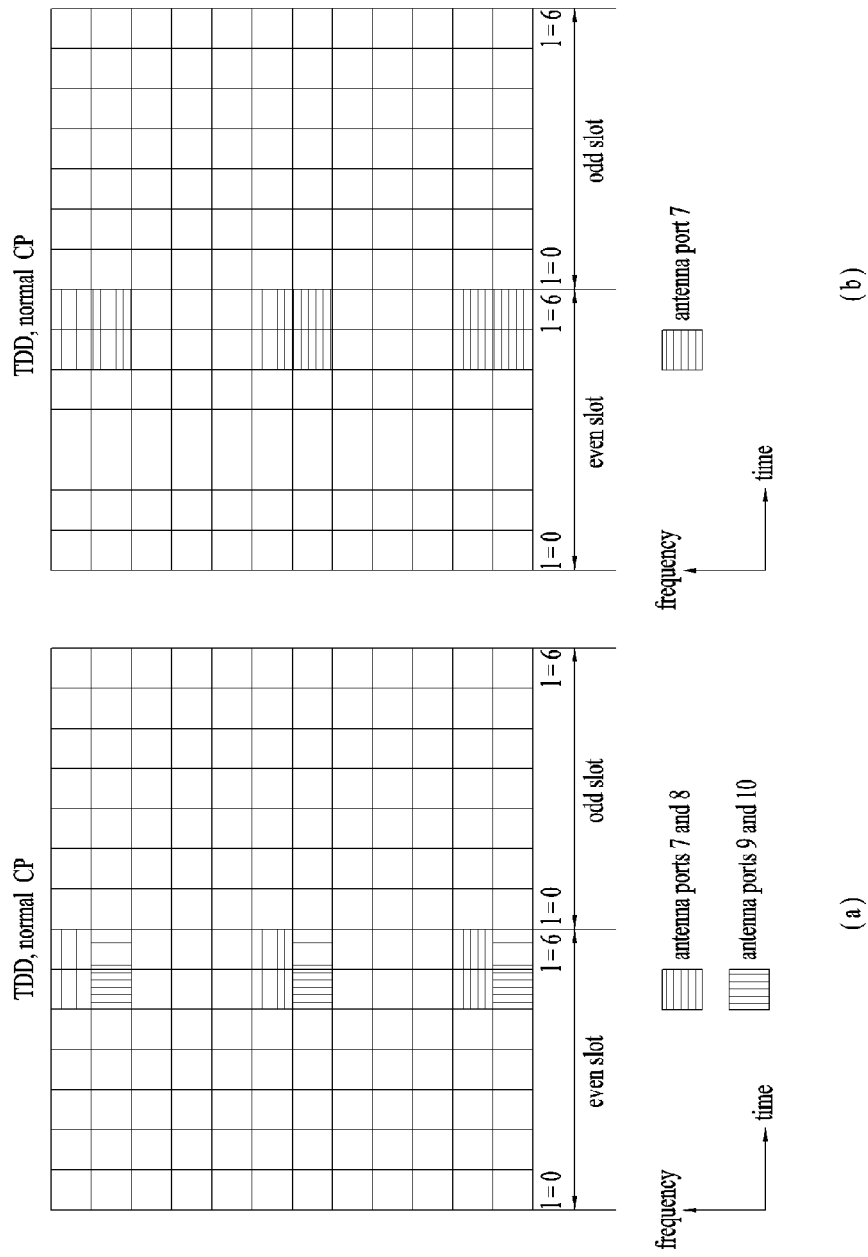
FIGS. 16 to 18 illustrate patterns of a UE specific reference signal used in a serving cell to which normal CP is applied in a TDD system.
Figure 17:
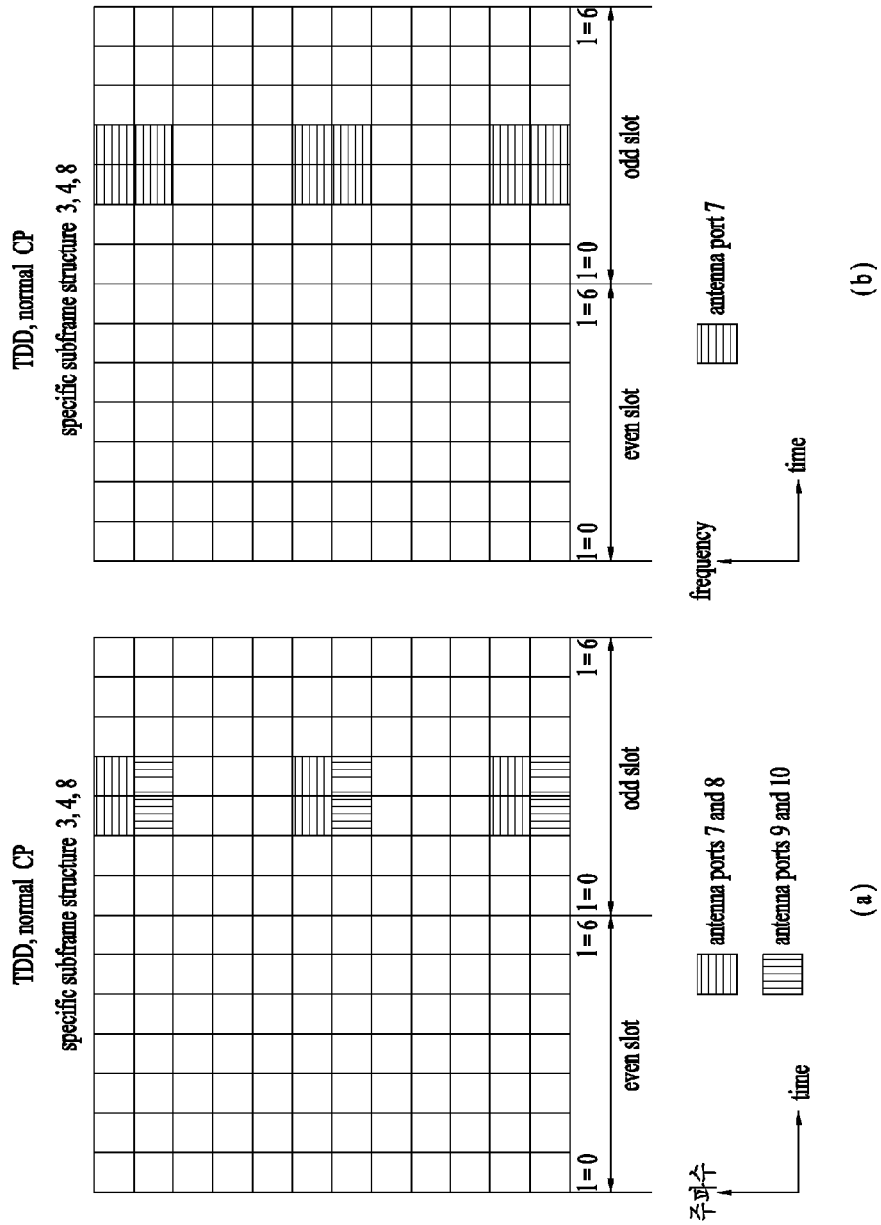
Figure 18:
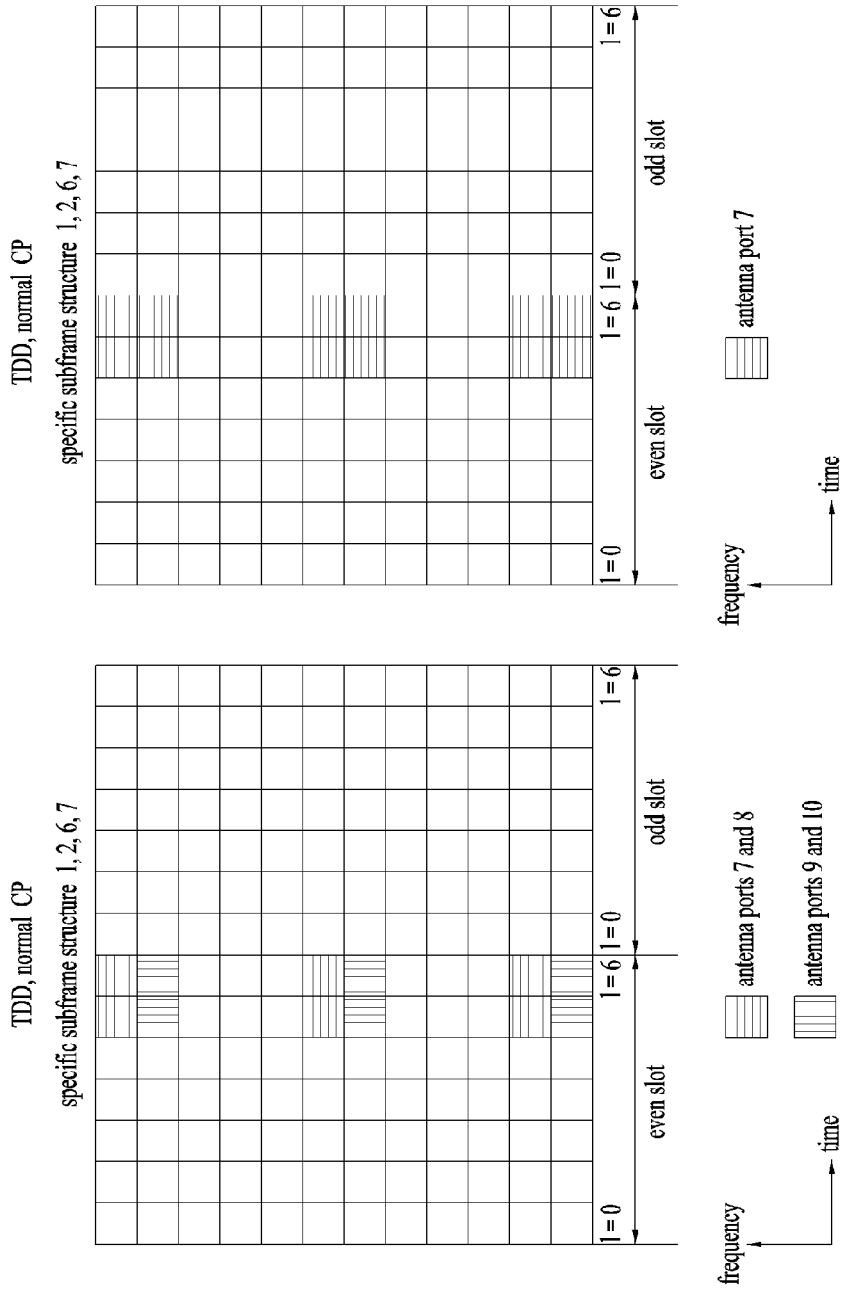

FIGS. 16 to 18 illustrate patterns of a UE specific reference signal used in a serving cell to which normal CP is applied in a TDD system.

Hereinafter, if the PSS/SSS is overlapped with the position of the frequency resource to which the UE-RS is allocated at a specific subframe to which TDD normal CP is applied, UE-RS pattern corresponding to a case where the UE-RS of the overlapped portion is not transmitted will be described.

FIG. 16(a), FIG. 17(a) and FIG. 18(a) illustrate UE-RS pattern that may transmit and receive a PDSCH signal to reach rank 4 by using antenna ports 7, 8, 9 and 10. At this time, the antenna ports 7, 8, 9 and 10 may be multiplexed by CDM and FDM as described in FIG. 14.

That is, in FIGS. 16 to 18, transmission of rank may be performed as much as the number of corresponding antenna ports as shown in the UE-RS pattern of FIG. 14, and transmission power increase of the UE-RS for improving PDSCH demodulation performance, which is based on decrease of the number of UE-RSs, may be applied equally. As another method, the PDSCH signal transmitted to RB to which the UE-RS is allocated as shown in FIGS. 16 to 18 may be limited to 1.

Also, FIG. 16(b), FIG. 17(b) and FIG. 18(b) illustrate UE-RS pattern that may transmit and receive a PDSCH signal of rank 1 by using a single antenna port.

3. Method for Puncturing UE-RS in NCT Environment

Hereinafter, in an NCT environment to which the UE-RS pattern described in FIGS. 12 to 18 is applied, a method for puncturing UE-RS if RE of a frequency resource to which the PSS/SSS is allocated is overlapped with RE to which UE-RS is allocated will be described.

Generally, in the LTE/LTE-A system, the PSS/SSS is allocated to even numbered of 6 RBs on the basis of a central frequency, and frequency resources of 6 RBs are all used. That is, the PSS/SSS is allocated to 72 subcarriers. However, in the NCT environment, a system bandwidth to which the PSS/SSS is allocated may include odd numbered of RBs. In this case, the PSS/SSS allocated to 72 subcarriers is not filled with all of the frequency resources corresponding to RB of the lowest index and RB of the highest index. At this time, the UE-RS allocated to the same OFDM symbol as that of the PSS/SSS is punctured but is not transmitted in the corresponding RBs.

FIGS. 19 to 23 illustrate methods for puncturing a UE-RS allocated to the same subframe to which a synchronization signal (PSS/SSS) is allocated.

In FIGS. 19 to 23, it is assumed that odd numbered of RBs (for example, 7 RBs) are allocated to the system bandwidth, RB of the lowest index is RB #k and RB of the highest index is RB #k+1. Also, it is assumed that REs for the PSS/SSS are allocated to 72 subcarriers on the basis of a central frequency of a system bandwidth at a specific subframe. At this time, the PSS/SSS is transmitted from an even numbered slot of the specific subframe, and the UE-RS is transmitted from even and odd numbered slots. In the drawings, RE marked with a horizontal pattern means a first UE specific RS (first UE-RS), and RE marked with a vertical pattern means a second UE specific RS (second UE-RS).

Figure 19:
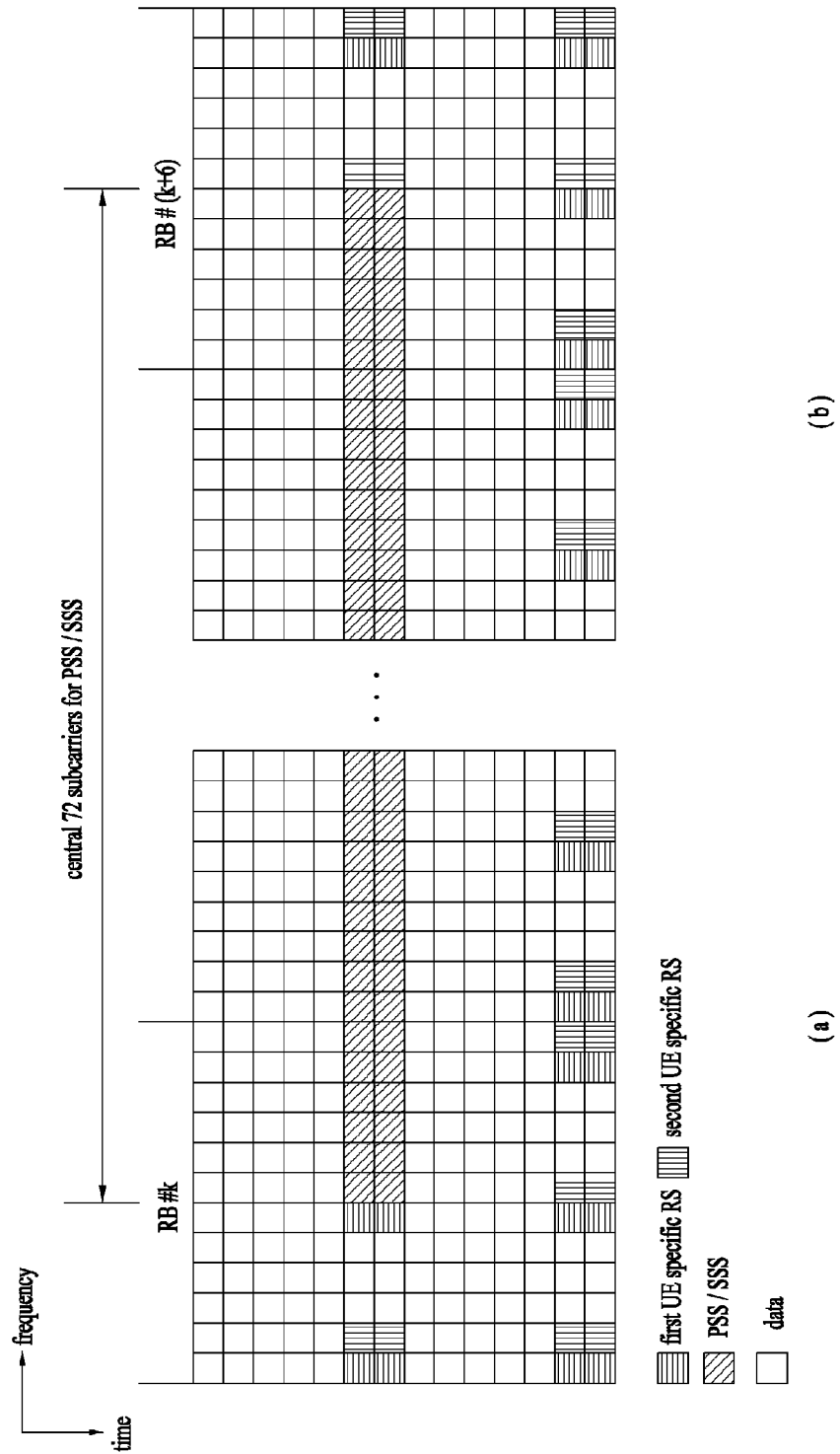
FIGS. 19 to 23 illustrate methods for puncturing a UE specific reference signal allocated to the same subframe to which a synchronization signal (PSS/SSS) is allocated.

Referring to FIG. 19, the UE-RS transmitted to the same position as RE position to which the PSS/SSS is allocated from the even numbered slot (that is, first slot) to which the PSS/SSS is transmitted is punctured and the other UE-RSs are transmitted. This is to minimize decrease of channel estimation performance, which is caused by the UE-RS which is not transmitted by being repeated with the PSS/SSS.

Alternatively, the UE-RS transmitted from the same OFDM symbol region as that of the PSS/SSS transmitted to the kth RB (that is, RB #k) in FIG. 19 may not be used in accordance with the embodied method of the UE. For example, if the PSS/SSS is transmitted to only a part of RB (for example, if the system bandwidth includes odd numbered of RBs (e.g., 25 RBs)), the UE-RS of the OFDM symbol to which the PSS/SSS is transmitted may partially be overlapped with the PSS/SSS, and at this time, the UE-RS is allocated to maximum 4 REs only. However, the U may be configured to estimate a channel by using all the UE-RS of one RB in accordance with the channel estimation method based on the UE-RS. In this case, since the UE-RS partially transmitted due to repetition with the PSS/SSS may not be used for channel estimation, it is preferable that the UE-RS is not transmitted.

In case of RB to which only a part of the UE-RSs is transmitted, such as RB #k in FIG. 19, density of the first UE-RS (that is, horizontal pattern RS) is relatively higher than that of the second UE-RS (that is, vertical pattern RS). Therefore, the UE performs PDSCH demodulation of rank 1 by using UE-RS antenna port x through which the first UE-RS is transmitted. Likewise, the UE may perform PDSCH demodulation of rank 1 by using the second UE-RS in RB #k+6.

Figure 20:
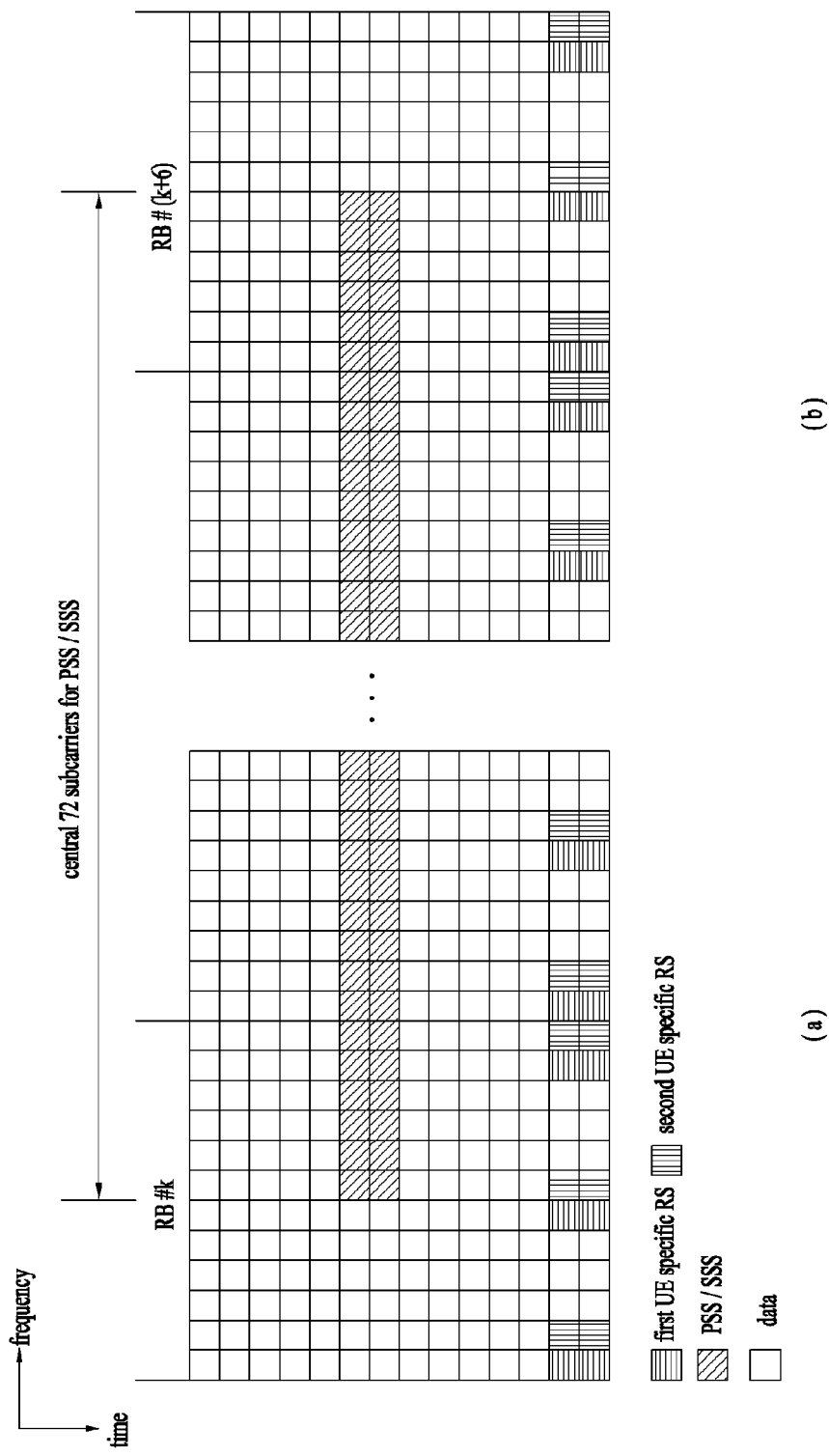

Referring to FIG. 20, if the PSS/SSS and a part of the UE-RS are allocated to the same RE resource in the kth RB and the k+6th RB where the PSS/SSS is allocated to a part of a frequency resource, all the UE-RS may be punctured without being transmitted. This is to reduce complexity of channel estimation. At this time, data (for example, PDSCH signal) may be transmitted to the REs where the UE-RSs are punctured.

If some or all of the UE-RSs are not transmitted from the corresponding RB due to collision between the PSS/SSS and the UE-RSs as shown in FIGS. 19 and 20, the UE may be operated on the assumption of some or all of the following items during PDSCH demodulation.

(1) Item 1: the PDSCH is transmitted by rank 1 from RB to which some or all of the PSS/SSS is transmitted.

(2) Item 2: if the UE is allocated with RB to which the PSS/SSS is not transmitted together with RB to which some or all of the PSS/SSS is transmitted, the PDSCH is transmitted by rank 1.

(3) Item 3: the UE is not allocated with RB to which some or all of the PSS/SSS is transmitted together with RB to which the PSS/SSS is not transmitted.

Figure 21:
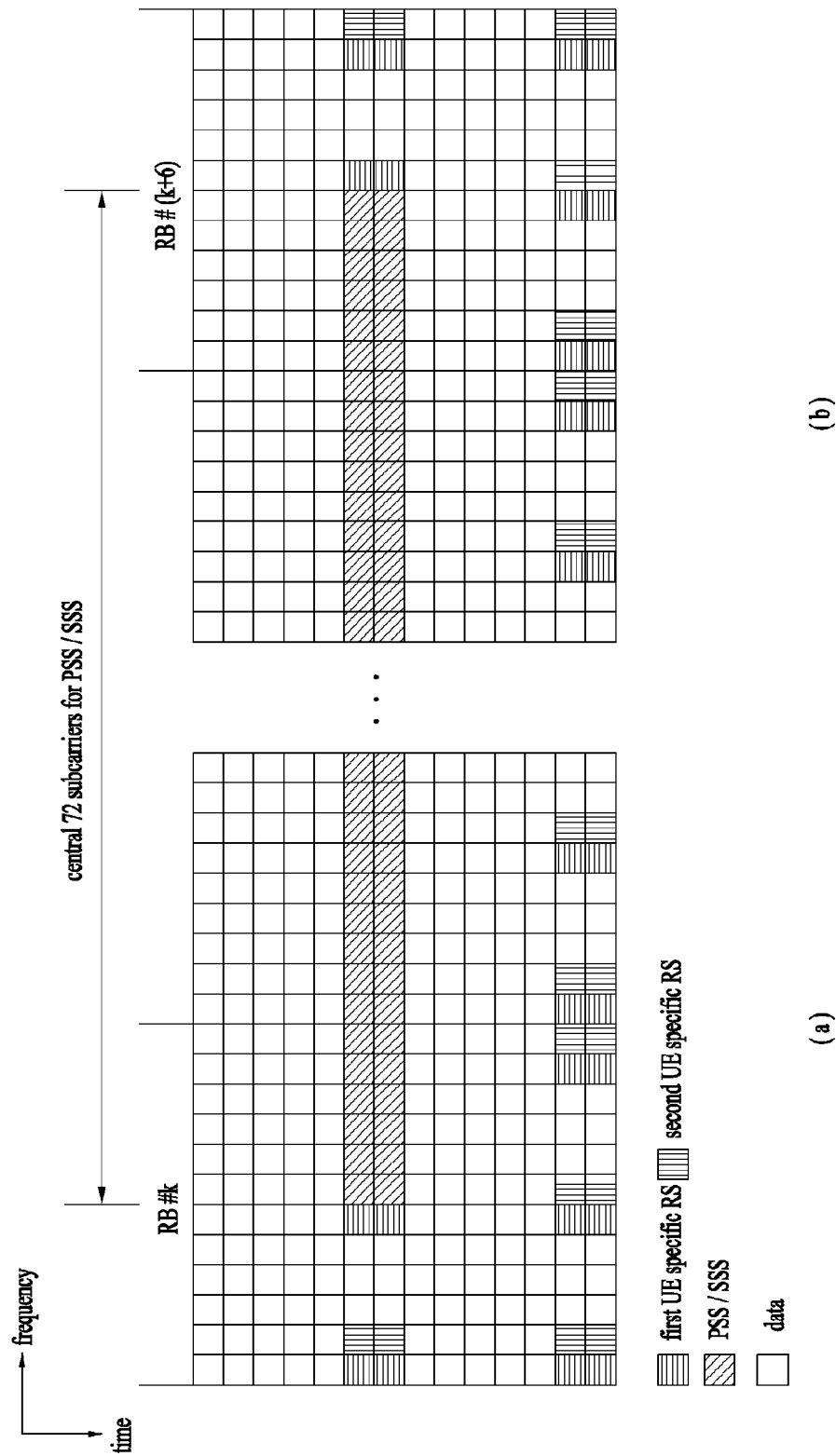

Referring to FIG. 21, if the RE to which the PSS/SSS is allocated is overlapped with the RE to which the UE-RS is allocated in RB #k and RB #k+6, the overlapped UE-RS is punctured. At this time, the UE-RS may not be transmitted from the RE adjacent to the PSS/SSS, whereby data transmission efficiency may be enhanced. That is, the UE-RSs allocated to REs which are not adjacent to the PSS/SSS may be transmitted without puncturing, and the UE may use the corresponding UE-RSs for PDSCH signal demodulation.

Figure 22:
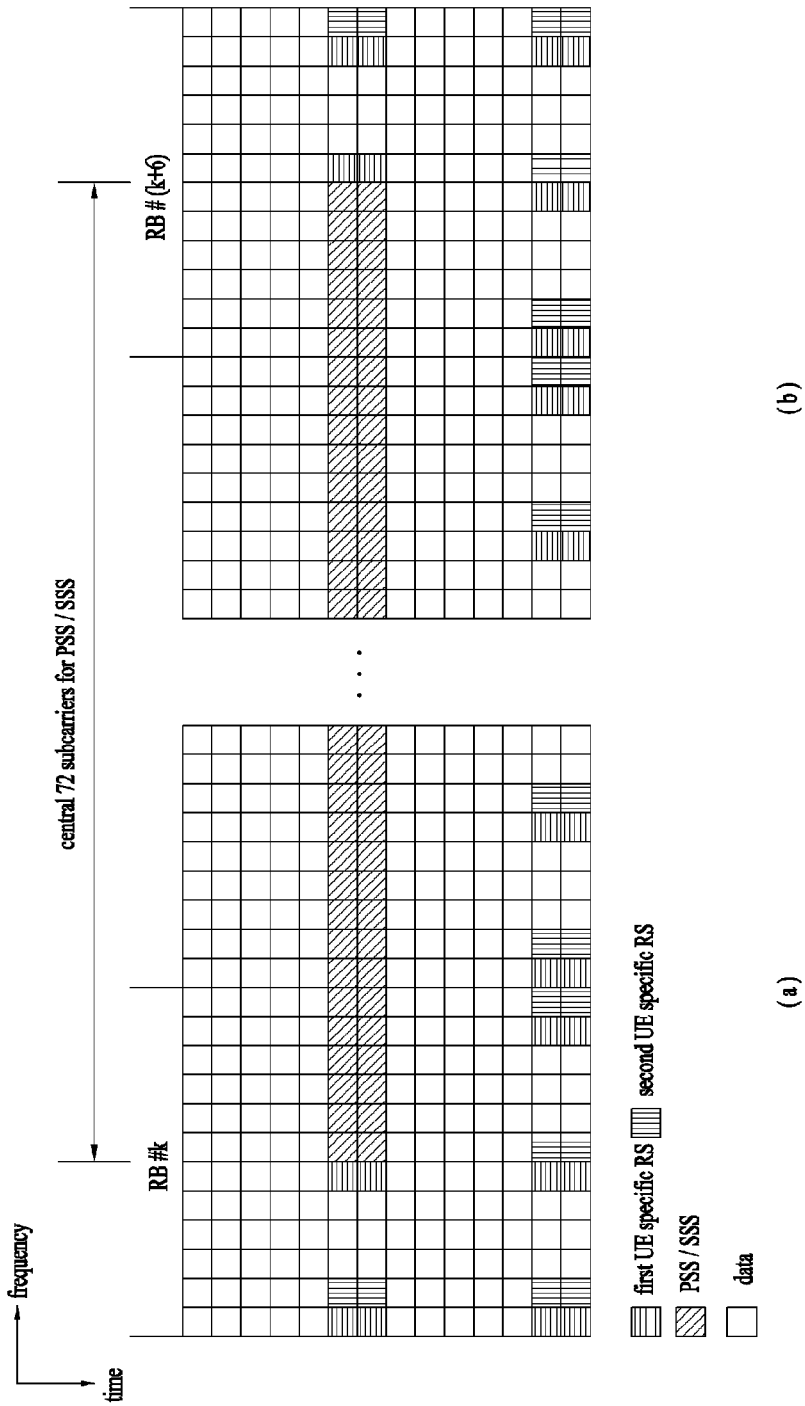

The subframe structure shown in FIG. 22 is the same as that of FIG. 19. However, the UE-RSs of antenna port corresponding to rank 1 or 2 may be transmitted to the neighboring REs of the PSS/SSS, whereby channel estimation performance may be improved.

Figure 23:
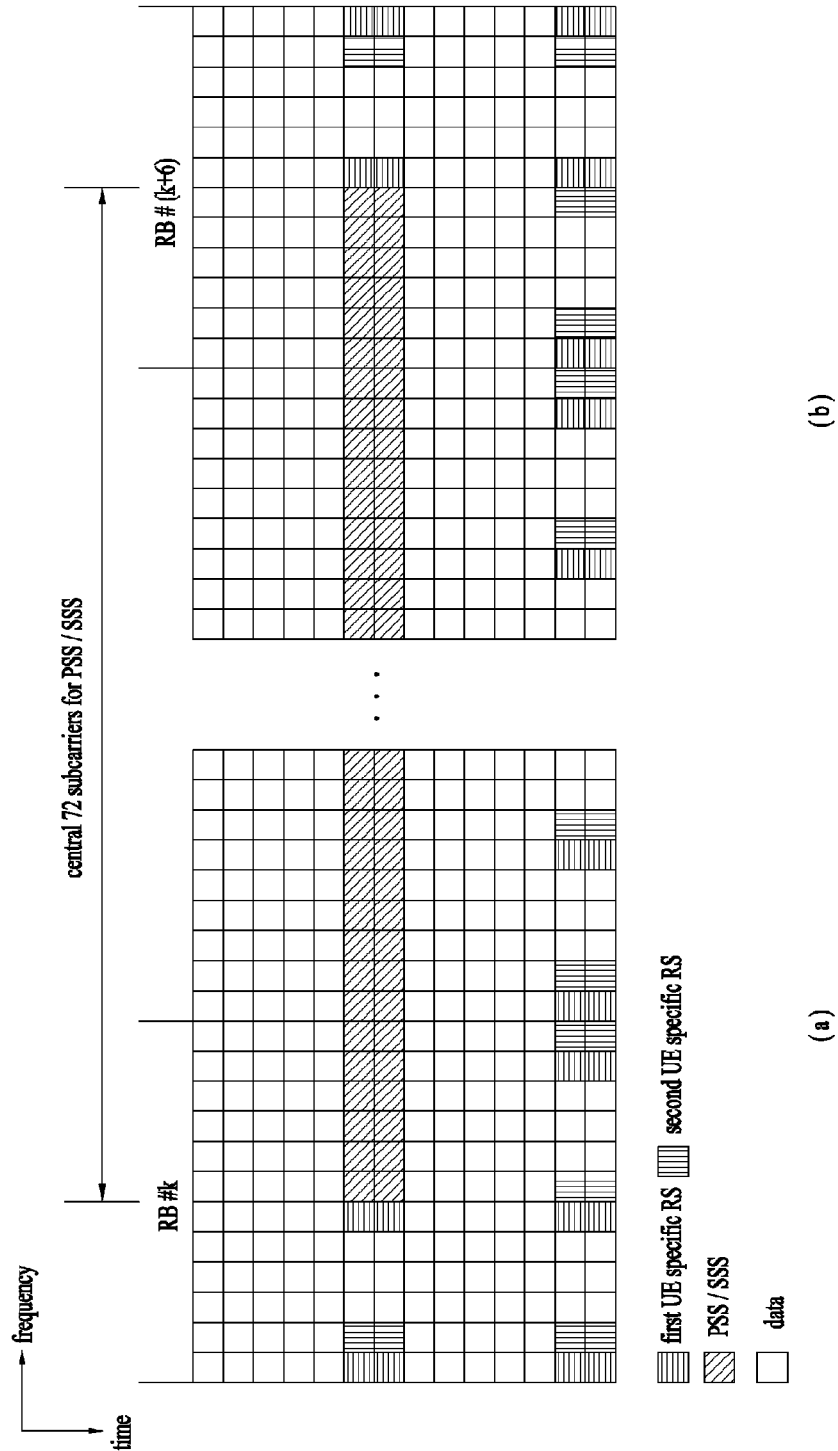

The subframe structure shown in FIG. 23 is the same as that of FIG. 19. However, in FIG. 23, the allocation positions of the UE-RSs transmitted from RB #k and RB #k+6 may be exchanged with each other, whereby channel estimation performance may be improved. For example, in some or all of RBs to which the PSS/SSS is transmitted, the base station may exchange the position of the REs to which the UE-RSs of the antenna ports corresponding to ranks 1 and 2 are allocated with the position of the REs to which the UE-RSs of the antenna ports to ranks 3 and 4 are allocated.

In the embodiments of the present invention, the DM-RS may be used as the UE-RS, and the UE-RS may be referred to as URS or UE specific RS.

Figure 24:
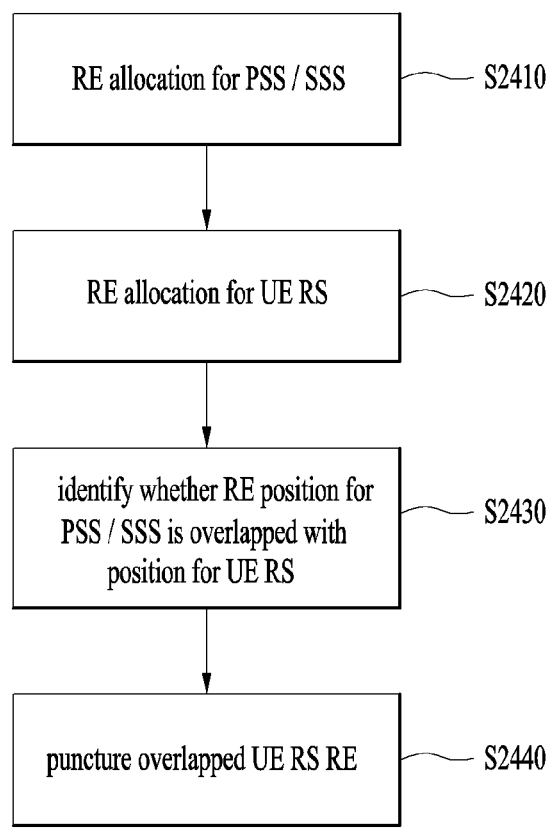
FIG. 24 illustrates one of methods for puncturing a UE specific reference signal.

FIG. 24 illustrates one of methods for puncturing UE-RS.

Referring to FIG. 24, in a radio access system that supports NCT, a base station that manages a synchronization reference carrier (that is, non-synchronized carrier, synchronization reference serving cell or second cell) may allocate REs for transmitting PSS/SSS to a specific subframe (S2410).

At this time, it is assumed that the PSS/SSS is allocated to odd numbered of RBs at the specific subframe, and all of the PSS and the SSS are not transmitted to a frequency region of RB of the lowest index and RB of the highest index among RBs to which the PSS/SSS is allocated.

The base station may allocate REs for transmitting UE-RS in accordance with UE-RS pattern to enhance channel estimation performance during downlink data transmission to the UE (S2420).

At this time, the base station may identify whether the allocation positions of the REs for PSS/SSS and REs for the UE-RS are overlapped with each other (S2430).

If the allocation positions of the REs for PSS/SSS and REs for the UE-RS are overlapped with each other partially or fully, some or all of the UE-RSs are punctured as shown in the subframe structure of FIGS. 19 to 23 (S2440).

Afterwards, the base station transmits the PSS/SSS, the UE-RS, and down link data to the UE by using the corresponding subframe structure.

In the NCT environment, the UE may receive the PSS/SSS transmitted through the synchronization reference carrier to acquire synchronization of the synchronized carrier (that is, synchronized serving cell, synchronized cell, NCT or first cell) through the synchronization reference carrier. Also, the UE may demodulate downlink data transmitted through the synchronization carrier on the basis of the UE-RS transmitted through the synchronization reference carrier. As a result, the UE may transmit and receive data through the synchronized carrier on the basis of uplink and/or downlink synchronization acquired through the synchronization reference carrier.

5. Apparatus

Figure 25:
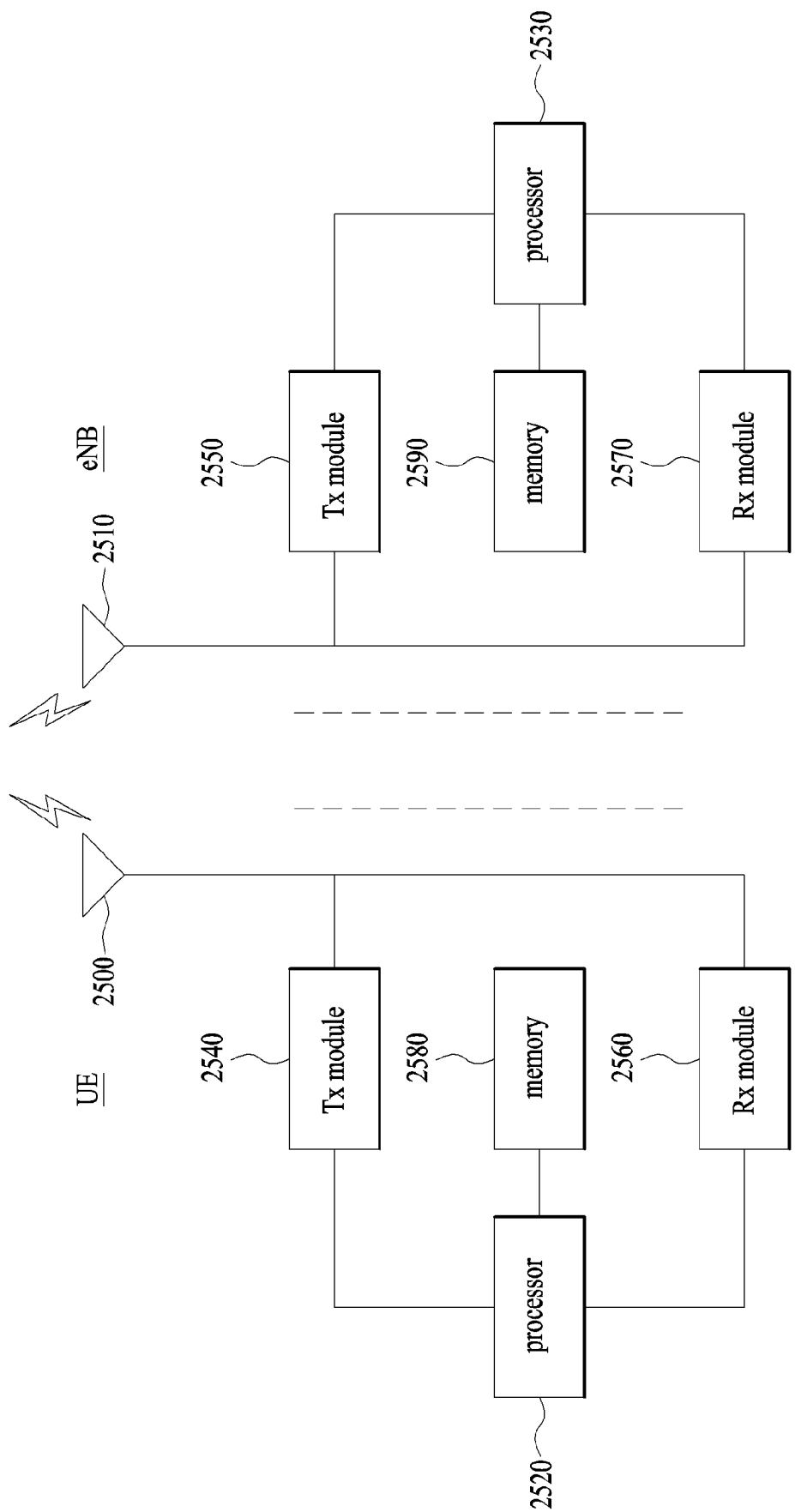
FIG. 25 illustrates a means through which methods described in FIGS. 1 to 24 may be implemented.

Apparatuses illustrated in FIG. 25 are means that can implement the methods described before with reference to FIGS. 1 to 24.

A UE may act as a transmitter on a UL and as a receiver on a DL. An eNB may act as a receiver on a UL and as a transmitter on a DL.

That is, each of the UE and the eNB may include a Transmission (Tx) module 2540 or 2550 and a Reception (Rx) module 2560 or 2570, for controlling transmission and reception of information, data, and/or messages, and an antenna 2500 or 2510 for transmitting and receiving information, data, and/or messages.

Each of the UE and the eNB may further include a processor 2520 or 2530 for implementing the afore-described embodiments of the present disclosure and a memory 2580 or 2590 for temporarily or permanently storing operations of the processor 2520 or 2530.

The embodiments of the present invention may be performed using the aforementioned elements and functions of the UE and the base station. For example, the base station of the radio access system that supports NCT may restrict transmission of the UE-RS by considering the allocation position of the PSS/SSS and the allocation position of the UE-RS. This will be understood with reference to the description made with reference to FIGS. 19 to 24. Also, the UE may acquire unlink and/or downlink synchronization of the first cell by receiving the PSS/SSS transmitted through the second cell, and may estimate a downlink channel of the first cell and/or the second cell and demodulate downlink data by receiving the UE-RS transmitted through the second cell.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 25 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS)

phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2580 or 2590 and executed by the processor 2520 or 2530. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for enabling a base station to puncture UE specific reference signals (UE-RSs) in a wireless access system supporting a new carrier type (NCT), the method comprising:
    allocating first resource elements (REs) for transmitting a synchronization signal at a subframe;
    allocating second REs for transmitting the UE-RS at the subframe in accordance with a UE-RS pattern; and
    puncturing overlapped second REs when the first REs overlap the second REs in their positions,
    wherein the base station manages a second cell for providing synchronization of a first cell which is the NCT, and the synchronization signal is allocated to odd numbered resource blocks (RBs) at the subframe,
    wherein when the first REs overlap the second REs, only the second REs that are overlapped in the odd numbered RBs are punctured and the other second REs are not punctured, and
    wherein a first UE-RS and a second UE-RS are allocated to the second REs, and one of the first UE-RS and the second UE-RS allocated to the second REs adjacent to the synchronization signal is transmitted using an antenna port corresponding to rank 1 or rank 2.

2. The method according to claim 1, wherein a transmission position of the first UE-RS and the second UE-RS allocated to an RB having the lowest index and a transmission position of the first UE-RS and the second UE-RS allocated to an RB having the highest index among the odd numbered RBs are exchanged with each other.

3. The method according to claim 1, wherein when the first REs overlap the second REs at the subframe, all of the other second REs in the odd numbered RBs are punctured.

4. The method according to claim 1, wherein the base station transmits downlink data signals to rank 1 through the odd numbered RBs.

5. The method according to claim 1, wherein a cell specific reference signal (CRS) is not transmitted from the first cell.

6. A base station for puncturing UE specific reference signals (UE-RSs) in a wireless access system supporting a new carrier type (NCT), the base station comprising:
    one or more antenna ports; and
    a processor that punctures UE-RSs,
    wherein the processor allocates first resource elements (REs) for transmitting a synchronization signal at a subframe, allocates second REs for transmitting the UE-RSs at the subframe in accordance with a UE-RS pattern and punctures overlapped second REs when the first REs overlap the second REs in their positions, and manages a second cell for providing synchronization of a first cell which is the NCT, and the synchronization signal is allocated to odd numbered resource blocks (RBs) at the subframe,
    wherein when the first REs overlap the second REs, only the second Res, that are overlapped in the odd numbered RBs are punctured and the other second REs are not punctured, and
    wherein a first UE-RS and a second UE-RS are allocated to the second REs, and one of the first UE-RS and the second UE-RS allocated to the second REs adjacent to the synchronization signal is transmitted using an antenna port corresponding to rank 1 or rank 2.

7. The base station according to claim 6, wherein a transmission position of the first UE-RS and the second UE-RS allocated to an RB having the lowest index and a transmission position of the first UE-RS and the second UE-RS allocated to an RB having the highest index among the odd numbered RBs are exchanged with each other.

8. The base station according to claim 6, wherein when the first REs overlap the second REs, all of the other second REs in the odd numbered RBs are punctured.

9. The base station according to claim 6, wherein the base station transmits downlink data signals to rank 1 through the odd numbered RBs.

10. The base station according to claim 6, wherein a cell specific reference signal (CRS) is not transmitted from the first cell.

\* \* \* \* \*